US011932303B2

(12) United States Patent
Homma et al.

(10) Patent No.: US 11,932,303 B2
(45) Date of Patent: Mar. 19, 2024

(54) STEERING DEVICE

(71) Applicant: YAMADA MANUFACTURING CO., LTD., Kiryu (JP)

(72) Inventors: Taisuke Homma, Kiryu (JP); Toru Sekiguchi, Kiryu (JP); Hiromitsu Baba, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 31 days.

(21) Appl. No.: 17/801,918

(22) PCT Filed: Mar. 19, 2021

(86) PCT No.: PCT/JP2021/011451
§ 371 (c)(1),
(2) Date: Aug. 24, 2022

(87) PCT Pub. No.: WO2021/193451
PCT Pub. Date: Sep. 30, 2021

(65) Prior Publication Data
US 2023/0081714 A1    Mar. 16, 2023

(30) Foreign Application Priority Data
Mar. 27, 2020 (JP) .................. 2020-058296

(51) Int. Cl.
*B62D 1/181* (2006.01)
*B62D 1/19* (2006.01)
*B62D 1/187* (2006.01)

(52) U.S. Cl.
CPC .............. *B62D 1/19* (2013.01); *B62D 1/181* (2013.01); *B62D 1/187* (2013.01)

(58) Field of Classification Search
CPC .......... B62D 1/181; B62D 1/187; B62D 1/19
See application file for complete search history.

(56) References Cited

U.S. PATENT DOCUMENTS 7,025,380 B2 * 4/2006 Arihara .................. B62D 1/181
                                                                       280/775
8,727,066 B2 * 5/2014 Jung .................... B62D 5/0478
                                                                       280/775

(Continued)

FOREIGN PATENT DOCUMENTS

GB         2579375 A  *  6/2020  ............ B62D 1/181
JP     2006-347243     12/2006

(Continued)

OTHER PUBLICATIONS

International Search Report, International Application No. PCT/JP2021/011451, dated May 11, 2021, 2 pages.

*Primary Examiner* — Paul N Dickson
*Assistant Examiner* — Maxwell L Meshaka
(74) *Attorney, Agent, or Firm* — Rankin, Hill & Clark LLP

(57) ABSTRACT

A steering device includes a pipe, a housing, a telescopic mechanism, and a load absorbing mechanism. The load absorbing mechanism includes an extending portion provided in the telescopic mechanism and extending in a front-rear direction, a first sliding portion provided on a first side in the left-right direction with respect to the extending portion, and a second sliding portion provided on a second side in the left-right direction with respect to the extending portion. The sliding portion includes a front pressing portion that comes into contact with a side surface of the extending portion, and a rear pressing portion provided behind the front pressing portion, and in which a distance in the left-right direction between the rear pressing portion and the other sliding portion facing the one sliding portion across the extending portion is shorter than a distance in the left-right direction between the front pressing portion and the other sliding portion.

7 Claims, 11 Drawing Sheets

(56) References Cited

U.S. PATENT DOCUMENTS

| | | | |
|---|---|---|---|
| 9,199,661 B2* | 12/2015 | Kawakami | B62D 1/187 |
| 9,616,914 B2* | 4/2017 | Stinebring | B62D 5/181 |
| 9,944,309 B2* | 4/2018 | Matsuno | B62D 1/19 |
| 10,654,514 B2* | 5/2020 | Shiroishi | B62D 1/184 |
| 10,807,630 B2* | 10/2020 | Caverly | B62D 1/192 |
| 10,989,284 B2* | 4/2021 | Terada | B62D 7/224 |
| 11,136,059 B1* | 10/2021 | Rouleau | B62D 1/187 |
| 11,225,282 B2* | 1/2022 | Toyoda | B62D 1/181 |
| 11,498,603 B2* | 11/2022 | Zhang | B62D 1/181 |
| 2003/0222448 A1* | 12/2003 | Arihara | B62D 1/181 |
| | | | 280/775 |
| 2012/0285285 A1* | 11/2012 | Tinnin | B62D 1/192 |
| | | | 74/493 |
| 2013/0126258 A1* | 5/2013 | Jung | B62D 5/0478 |
| | | | 180/444 |
| 2015/0059512 A1* | 3/2015 | Kawakami | B62D 1/187 |
| | | | 74/493 |
| 2016/0046318 A1* | 2/2016 | Stinebring | B62D 1/181 |
| | | | 74/493 |
| 2017/0113711 A1* | 4/2017 | Matsuno | B62D 1/192 |
| 2019/0152507 A1* | 5/2019 | Shiroishi | B62D 1/184 |
| 2019/0185045 A1 | 6/2019 | Takahashi et al. | |
| 2019/0283793 A1 | 9/2019 | Matsuno et al. | |
| 2019/0301574 A1* | 10/2019 | Terada | F16H 25/2006 |
| 2020/0039567 A1 | 2/2020 | Sekiguchi et al. | |
| 2020/0172147 A1* | 6/2020 | Caverly | B62D 1/195 |
| 2020/0207403 A1 | 7/2020 | Kirmsze | |
| 2020/0339178 A1* | 10/2020 | Toyoda | B62D 1/19 |
| 2021/0309281 A1* | 10/2021 | Rouleau | B62D 15/0215 |
| 2023/0081714 A1* | 3/2023 | Homma | B62D 1/181 |
| | | | 74/493 |
| 2023/0131460 A1* | 4/2023 | Ponikiewski | B62D 1/184 |
| | | | 74/493 |
| 2023/0249737 A1* | 8/2023 | Case | B62D 1/184 |
| | | | 74/493 |
| 2023/0294750 A1* | 9/2023 | Hwangbo | B62D 1/187 |
| | | | 74/493 |

FOREIGN PATENT DOCUMENTS

| | | | | |
|---|---|---|---|---|
| JP | 2019-107993 | | 7/2019 | |
| JP | 2019-156334 | | 9/2019 | |
| JP | 2020-19327 | | 2/2020 | |
| KR | 20090123210 A | * | 12/2009 | |
| WO | WO-2016131214 A1 | * | 8/2016 | B62D 1/184 |
| WO | WO-2019016947 A1 | * | 1/2019 | |
| WO | 2019/030285 | | 2/2019 | |

* cited by examiner

STEERING DEVICE

TECHNICAL FIELD

The present disclosure relates to a steering device.

Priority is claimed on Japanese Patent Application No. 2020-058296, filed Mar. 27, 2020, the content of which is incorporated herein by reference.

BACKGROUND ART

A certain steering device is provided with a telescopic function of adjusting front and rear positions of a steering wheel in accordance with a body difference or a driving posture of a driver. This type of the steering device includes an outer column supported by a vehicle body, an inner column held inside the outer column to be movable in a front-rear direction, and a telescopic mechanism that connects the outer column and the inner column to be movable forward and rearward. The inner column supports a steering shaft to be rotatable. A steering wheel is attached to a rear end portion of the steering shaft.

The steering device is equipped with a configuration that cushions an impact load applied to the driver in a process in which the inner column moves forward with respect to the outer column (collapse stroke), when a predetermined load acts on the steering wheel at the time of a secondary collision. For example, Patent Document 1 below discloses a configuration in which a guide projection formed in the telescopic mechanism is held in a guide groove formed in the outer column.

In the steering device according to Patent Document 1, during a telescopic operation, the inner column is moved forward and rearward with respect to the outer column together with the telescopic mechanism (electric motor) by a driving force of the telescopic mechanism.

On the other hand, at the secondary collision, when a predetermined load acts on the steering wheel, the inner column is separated from the telescopic mechanism. In this manner, the inner column tries to move forward with respect to the outer column. In this case, the inner column moves forward while the guide projection expands a width of the guide groove. As a result, the steering device according to Patent Document 1 cushions the impact load applied to the driver at the secondary collision.

CITATION LIST

Patent Document

[Patent Document 1]
Japanese Unexamined Patent Application, First Publication No. 2006-347243

SUMMARY OF INVENTION

Technical Problem

Incidentally, in order to efficiently cushion the impact load, it is conceivable that plastically deforming any one of the guide projection and an inner wall of the guide groove is preferable. In this case, in order to improve impact absorbing performance, it is conceivable to increase a tightening allowance (overlapping amount in a front view) of the guide projection and the guide groove.

However, when the tightening allowance of the guide projection and the guide groove increases, particularly, an initial load (starting load) is likely to increase. As a result, the steering device in the related art has a problem in that a load during the collapse stroke (stroke at the secondary collision) greatly fluctuates.

The present disclosure provides a steering device which can prevent load fluctuations during a collapse stroke and can stabilize absorbed energy.

Solution to Problem

In order to solve the above-described problem, the present disclosure adopts the following aspects.

(1) According to an aspect of the present disclosure, there is provided a steering device including a pipe into which a steering shaft is inserted to be rotatable around an axis along a front-rear direction, a housing supported by a vehicle body and configured to support the pipe to be movable in the front-rear direction, a telescopic mechanism configured to move the pipe with respect to the housing in the front-rear direction, and a load absorbing mechanism configured to connect the pipe and the telescopic mechanism to each other. The telescopic mechanism includes an actuator coupled to the housing, and a feed mechanism having an engaging portion coupled to the actuator and an engaged portion coupled to the load absorbing mechanism and engaged with the engaging portion in the front-rear direction and configured to transmit a driving force of the actuator to the pipe via the engaging portion and the engaged portion. The load absorbing mechanism includes an extending portion coupled to any one member of the pipe and the feed mechanism and extending in the front-rear direction, and sliding portions each provided on both sides in a left-right direction with respect to the extending portion in the other member of the pipe and the telescopic mechanism, and moving with respect to the one member while sliding on a side surface of the extending portion which faces the left-right direction, when a forward load acting on the pipe has a predetermined value or greater. At least one of the sliding portions includes a front pressing portion that comes into contact with the side surface of the extending portion, and a rear pressing portion provided behind the front pressing portion, and in which a first distance in the left-right direction between the rear pressing portion and the other sliding portion facing the one sliding portion across the extending portion is shorter than a second distance in the left-right direction between the front pressing portion and the other sliding portion.

According to this aspect, when each of the front pressing portion and the rear pressing portion slides on the side surface of the extending portion, an impact load can be cushioned by plastically deforming the extending portion or the sliding portion. In this case, in order to secure absorbed energy with respect to the impact load, a tightening allowance between the respective pressing portions and the extending portion can be decreased, compared to a case of increasing a tightening allowance between one pressing portion and the extending portion. The impact load applied to the sliding portion can be distributed to the front pressing portion and the rear pressing portion. Therefore, the sliding portion as a whole can cope with a higher load. As a result, the absorbed energy absorbed by the load absorbing mechanism can be stabilized over an entire region of a collapse stroke. Since the impact load applied to the sliding portion is distributed to the front pressing portion and the rear pressing portion, strength of the sliding portion can be secured.

Moreover, in this aspect, the engaging portion and the engaged portion of the telescopic mechanism engage with each other in the front-rear direction. Therefore, at the time of a secondary collision, forward movement of the feed mechanism with respect to the actuator is restricted. In this manner, at the secondary collision, it is possible to prevent the load absorbing mechanism from moving forward together with the feed mechanism. Therefore, a load can be effectively generated between the extending portion and the sliding portion. As a result, desired impact absorbing performance can be secured.

The actuator of the telescopic mechanism is fixed to the housing. Therefore, the actuator does not move during a telescopic operation and at the secondary collision. Therefore, it is not necessary to secure a movement space of the actuator around the steering device. In this manner, layout designing can be improved.

(2) In the steering device according to the aspect (1), it is preferable that a rear contact portion of the rear pressing portion which comes into contact with the extending portion and a front contact portion of the front pressing portion which comes into contact with the extending portion form curved surfaces each projecting toward the extending portion.

According to this aspect, the respective contact portions form the curved surfaces. Therefore, when the sliding portion slides on the extending portion during a collapse stroke generated due to the secondary collision, it is possible to prevent the pressing portion and the extending portion from being caught on each other. In this manner, the sliding portion can be smoothly moved on the extending portion. Accordingly, the impact load can be efficiently cushioned over the entire collapse stroke. Therefore, the impact absorbing performance can be improved.

(3) In the steering device according to the aspect (1) or (2), it is preferable that the one member is provided with a first guide located on a side opposite to the extending portion in the left-right direction with respect to the one sliding portion and configured to guide movement of the one sliding portion in the front-rear direction, and a second guide located on a side opposite to the extending portion in the left-right direction with respect to the other sliding portion, and configured to guide movement of the other sliding portion in the front-rear direction.

According to this aspect, the respective sliding portions can be smoothly moved in the front-rear direction along the extending portion during the collapse stroke generated due to the secondary collision. When the respective sliding portions tries to move or deform outward in the left-right direction due to the load acting between the extending portion and the respective sliding portions, the movement or the deformation of the respective sliding portions can be restricted by the guide.

(4) In the steering device according to the aspect (3), it is preferable that a surface of the one sliding portion which faces the first guide and a surface of the other sliding portion which faces the second guide are formed into flat surfaces extending in the front-rear direction.

According to this aspect, the sliding portion is smoothly guided along the facing surface of the guide which faces the sliding portion during the collapse stroke generated due to the secondary collision.

(5) In the steering device according to the aspect (4), it is preferable that the extending portion include a first narrow portion formed so that a width in the left-right direction is larger than the first distance and is equal to or smaller than the second distance, and the front pressing portion comes into contact, a second narrow portion located behind the first narrow portion, and formed so that a width in the left-right direction is equal to or smaller than the first distance, and a wide portion located in front of the first narrow portion, and formed so that a width in the left-right direction is larger than the second distance.

According to this aspect, during the collapse stroke generated due to the secondary collision, the wide portion is plastically deformed by the front pressing portion of the sliding portion, and thereafter, a portion through which the front pressing portion passes is further plastically deformed by the rear pressing portion. In this manner, it is possible to prevent an increase in the tightening allowance between the respective pressing portions and the extending portion. Absorbed energy with respect to the impact load is secured by both the respective pressing portions over the entire region of the collapse stroke. Therefore, the impact absorbing performance can be secured.

(6) In the steering device according to any one of the aspects (1) to (5), it is preferable that the feed mechanism include a shaft coupled to an output shaft of the actuator and having a male screw as the engaging portion, and a nut connected to the one member and having a female screw portion that engages with the male screw as the engaged portion.

According to this aspect, a feed screw mechanism is adopted as the telescopic mechanism. In this manner, it is easy to secure an engagement force between the male screw of the shaft and the female screw of the nut. It is easy to adjust a stroke of the pipe with respect to a rotation amount of the actuator during the telescopic operation. The impact absorbing mechanism is coupled to the feed screw mechanism serving as the feed mechanism. In this manner, the nut is locked to the shaft at the secondary collision. Therefore, the forward movement of the feed mechanism (nut) is restricted. In this manner, at the secondary collision, it is possible to prevent the load absorbing mechanism from moving forward together with the feed mechanism. Therefore, a load can be effectively generated between the extending portion and the sliding portion. As a result, desired impact absorbing performance can be secured.

(7) In the steering device according to any one of the aspects (1) to (6), it is preferable that the load absorbing mechanism includes a restriction member configured to restrict movement of the extending portion in an up-down direction with respect to the sliding portion.

According to this aspect, the movement of the extending portion in the up-down direction with respect to the sliding portion is restricted. As a result, the sliding portion can be prevented from being separated from the extending portion, and absorbed energy absorbed by the load absorbing mechanism can be stabilized over an entire region of a collapse stroke.

Advantageous Effects of Invention

According to the above-described respective aspects, load fluctuations during the collapse stroke can be prevented, and the absorbed energy can be stabilized.

DESCRIPTION OF EMBODIMENTS

Figure 1:
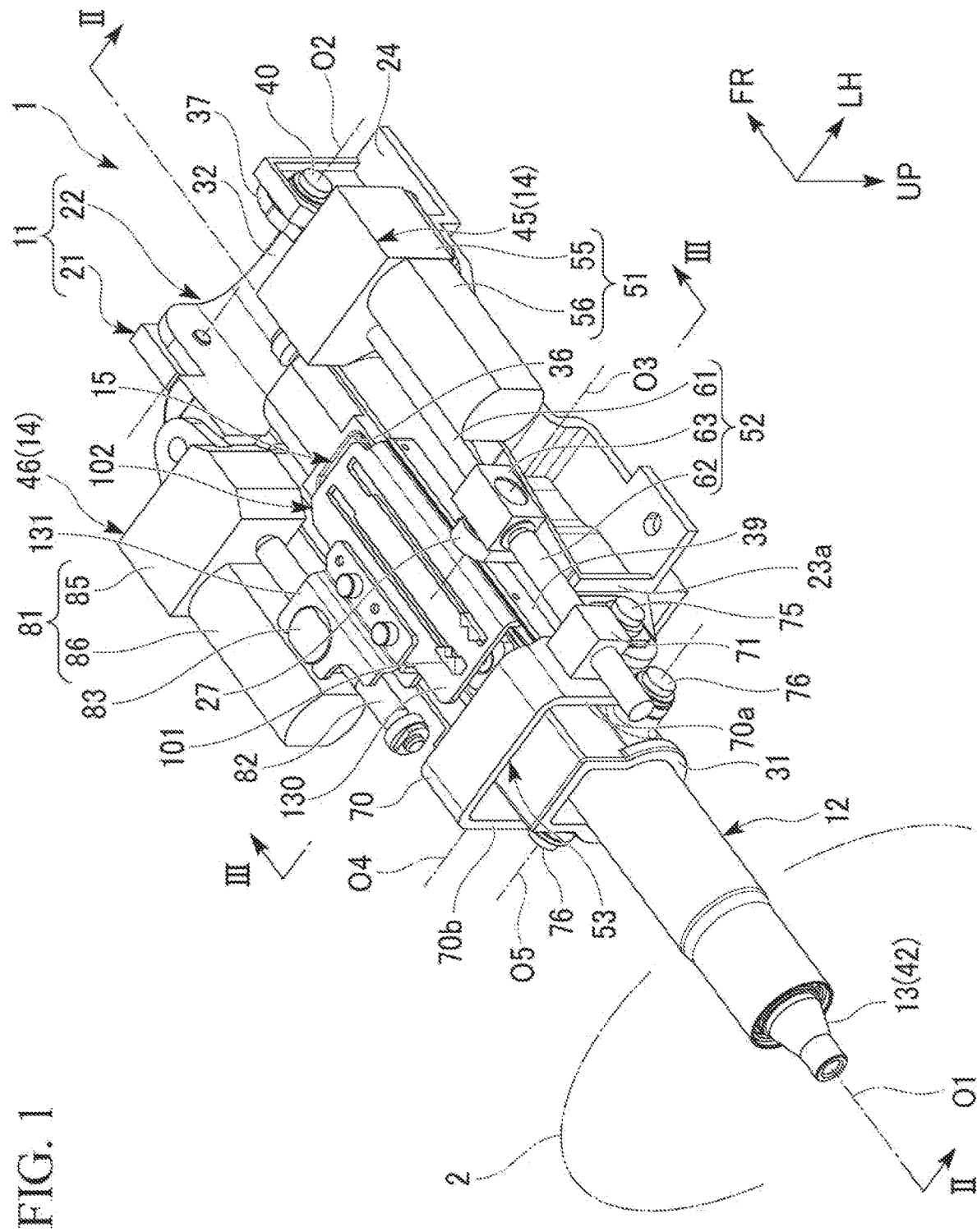
FIG. 1 is a perspective view of a steering device.

Hereinafter, an embodiment according to the present disclosure will be described with reference to the drawings. In the embodiments or modification examples described below, the same reference numerals will be assigned to corresponding configurations, and description thereof may be omitted in some cases. In the following description, for example, expressions indicating relative or absolute dispositions such as "parallel", "perpendicular", "center", and "coaxial" not only strictly represent the disposition, but also represent a state of relative displacement with an angle or a distance to such an extent that tolerances or the same functions can be obtained.

[Steering Device 1]

FIG. 1 is a perspective view of a steering device 1.

As represented in FIG. 1, the steering device 1 is mounted on a vehicle. The steering device 1 adjusts a steering angle of vehicle wheels in accordance with a rotational operation of a steering wheel 2.

The steering device 1 includes a housing 11, a pipe 12, a steering shaft 13, a drive mechanism 14, and a load absorbing mechanism 15. The pipe 12 and the steering shaft 13 each are formed along an axis O1. Therefore, in the following description, an extending direction of the axis O1 of the pipe 12 and the steering shaft 13 will be simply referred to as a shaft axial direction, a direction perpendicular to the axis O1 will be simply referred to as a shaft radial direction, and a direction around the axis O1 will be simply referred to as a shaft circumferential direction, in some cases.

The steering device 1 according to the present embodiment is mounted on a vehicle in a state where the axis O1 intersects with a front-rear direction. Specifically, the axis O1 of the steering device 1 extends upward as the steering device 1 is directed rearward. However, in the following description, for the sake of convenience, in the steering device 1, a direction toward the steering wheel 2 in the shaft axial direction will be simply referred to as rearward, and a direction toward a side opposite to the steering wheel 2 will be simply referred to as forward (arrow FR). In the shaft radial direction, an up-down direction in a state where the steering device 1 is attached to the vehicle will be simply referred to as an up-down direction (arrow UP represents upward), and a left-right direction in the same state will be simply referred to as a left-right direction (arrow LH represents a left side).

<Housing 11>

Figure 2:
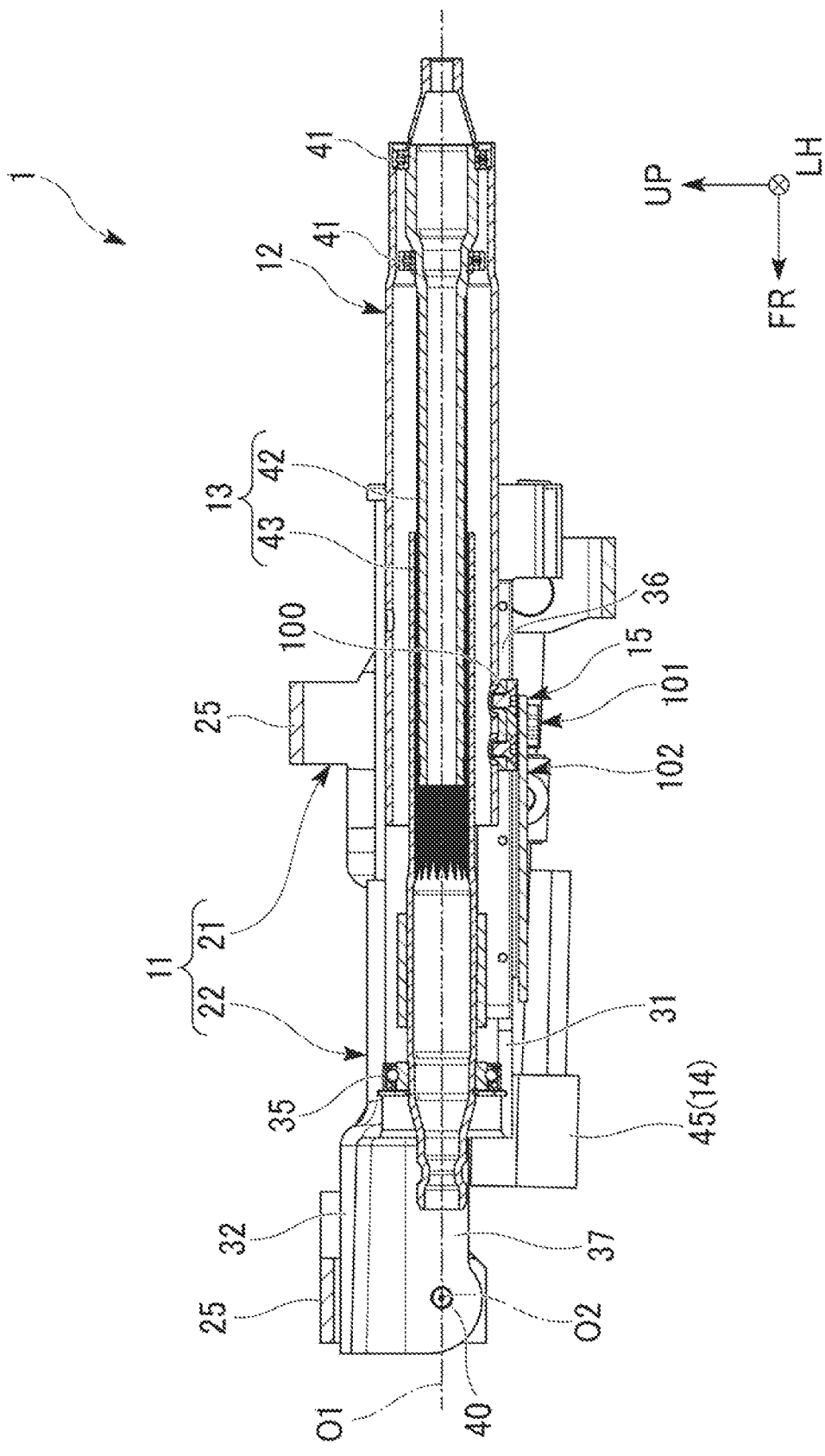
FIG. 2 is a sectional view taken along line II-II in FIG. 1.

FIG. 2 is a sectional view taken along line II-II in FIG. 1.

Figure 3:
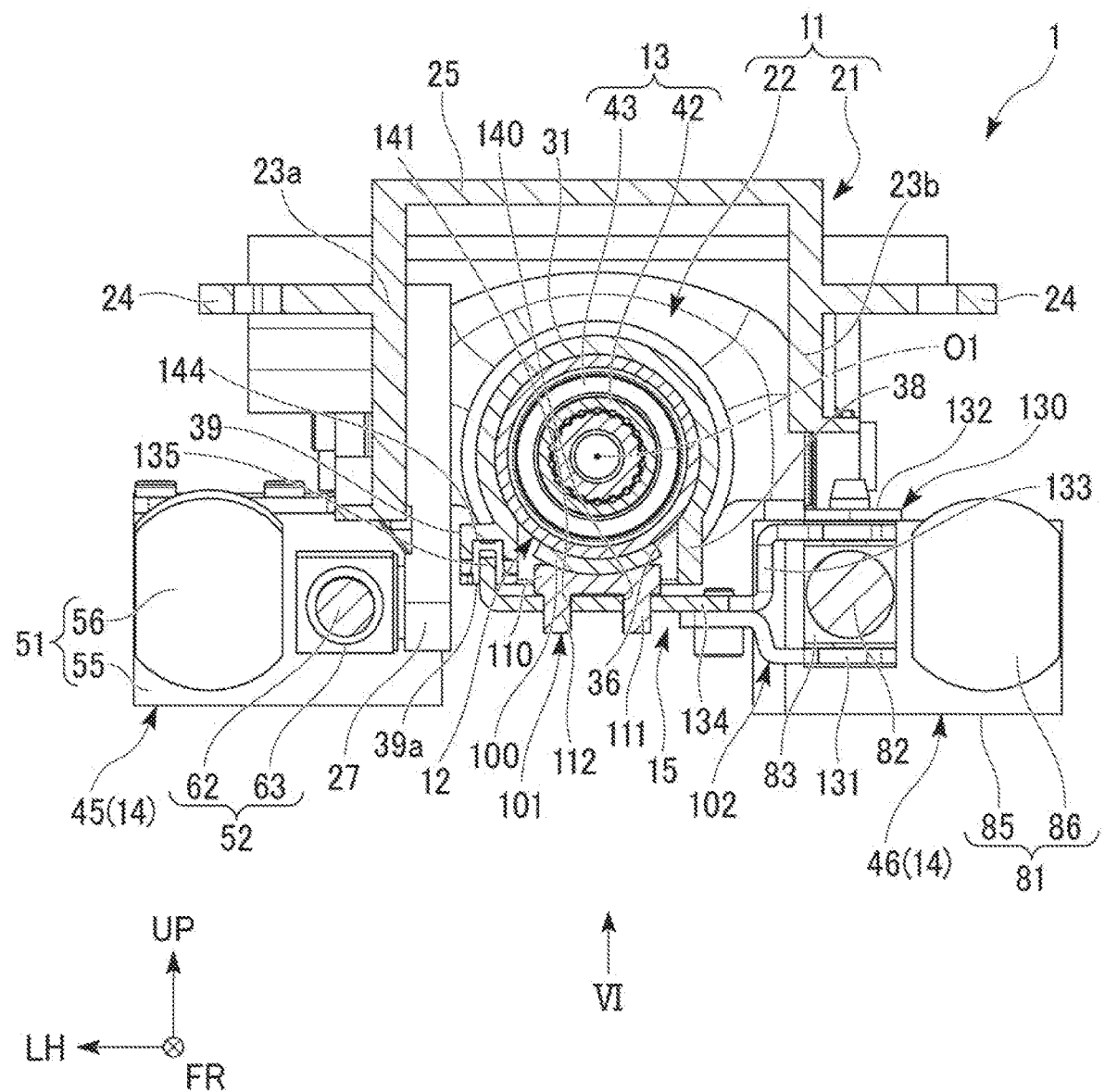
FIG. 3 is a sectional view taken along line III-III in FIG. 1.

FIG. 3 is a sectional view taken along line III-III in FIG. 1.

As represented in FIGS. 1 to 3, the housing 11 includes a tilt bracket 21 and a housing body 22.

The tilt bracket 21 includes a pair of left and right side frames 23a and 23b, attachment stays 24 formed in the respective side frames 23a and 23b, and a bridge 25 for bridging the respective side frames 23a and 23b.

The side frames 23a and 23b extend in the front-rear direction while the left-right direction is used as a thickness direction. Out of lower end edges of the side frames 23a and 23b, a protruding piece 27 is formed in a front end portion of the side frame 23a on one side (left side). The protruding piece 27 protrudes downward from the front end portion of one side frame 23a.

Each of the attachment stays 24 projects outward in the left-right direction from upper end portions of the side frames 23a and 23b. The housing 11 is supported by a vehicle body via the attachment stay 24.

The bridge 25 integrally bridges the upper end portions of the respective side frames 23. Each of the bridges 25 is provided in both front and rear end portions in the side frames 23.

The housing body 22 is disposed inside the tilt bracket 21. The housing body 22 has a holding cylinder 31 and a front extending portion 32.

The holding cylinder 31 is formed in a cylindrical shape extending in the shaft axial direction (front-rear direction). As represented in FIG. 2, an outer ring of a front bearing 35 is fitted (press-fitted) to a front end portion inside the holding cylinder 31. As represented in FIGS. 1 to 3, a slit 36 is formed in an intermediate portion of the holding cylinder 31 in the front-rear direction. The slit 36 extends in the front-rear direction.

As represented in FIG. 3, in the holding cylinder 31, protruding walls (first protruding wall 38 and second protruding wall 39) are formed in opening edges of the slit 36. The first protruding wall 38 protrudes downward from a right opening edge in the opening edges of the slit 36. The first protruding wall 38 extends in the front-rear direction along the right opening edge of the slit 36.

The second protruding wall 39 protrudes downward from a left opening edge in the opening edges of the slit 36. The second protruding wall 39 extends in the front-rear direction along the left opening edge of the slit 36. The second protruding wall 39 has a recess portion 39a which is open downward.

As represented in FIG. 1, the front extending portion 32 protrudes forward from the holding cylinder 31. The front extending portion 32 is formed in a U-shape which is open downward in a sectional view perpendicular to the front-rear direction. In the represented example, a distance between the pair of side walls 37 facing each other in the left-right direction in the front extending portion 32 is longer than an outer diameter of the holding cylinder 31. The side walls 37 each are coupled to the side frames 23a and 23b facing each other in the tilt bracket 21 via a pivot shaft 40. In this manner, the housing body 22 is supported by the tilt bracket 21 to be pivotable around the pivot shaft 40 (around an axis O2 extending in the left-right direction).

<Pipe 12>

The pipe 12 is formed in a cylindrical shape extending in the shaft axial direction. The pipe 12 is inserted into the holding cylinder 31. The pipe 12 is configured to be movable in the shaft axial direction with respect to the holding cylinder 31. As represented in FIG. 2, an outer ring of a rear bearing 41 is fitted (press-fitted) to a rear end portion of the pipe 12.

<Steering Shaft 13>

The steering shaft 13 includes an inner shaft 42 and an outer shaft 43.

The inner shaft 42 is formed in a cylindrical shape extending in the shaft axial direction. The inner shaft 42 is inserted into the pipe 12. A rear end portion of the inner shaft 42 is press-fitted to an inner ring of the rear bearing 41. In this manner, the inner shaft 42 is supported to be rotatable around the axis O1 via the rear bearing 41. The steering wheel 2 is coupled to a portion protruding rearward from the pipe 12 in the inner shaft 42. The inner shaft 42 may be solid.

The outer shaft 43 is formed in a cylindrical shape extending in the shaft axial direction. The outer shaft 43 is inserted into the pipe 12. The inner shaft 42 is inserted into a rear end portion of the outer shaft 43 inside the pipe 12. A front end portion of the outer shaft 43 is press-fitted to an inner ring of the front bearing 35 inside the holding cylinder 31. In this manner, the outer shaft 43 is supported to be rotatable around the axis O1 inside the holding cylinder 31.

The inner shaft 42 and the pipe 12 are configured to be movable in the shaft axial direction with respect to the outer shaft 43. An outer peripheral surface of the inner shaft 42 has a male spline, for example. The male spline engages with a female spline formed on an inner peripheral surface of the outer shaft 43. In this manner, while relative rotation with respect to the outer shaft 43 is restricted, the inner shaft 42 moves in the shaft axial direction with respect to the outer shaft 43. However, a telescopic structure or a rotation restriction structure of the steering shaft 13 can be appropriately changed. In the present embodiment, a configuration has been described in which the outer shaft 43 is disposed forward of the inner shaft 42. However, the present embodiment is not limited only to this configuration. A configuration may be adopted so that the outer shaft 43 is disposed behind the inner shaft 42.

<Drive Mechanism 14>

As represented in FIG. 1, the drive mechanism 14 includes a tilt mechanism 45 and a telescopic mechanism 46. For example, the tilt mechanism 45 is disposed on the left side of the housing 11. For example, the telescopic mechanism 46 is disposed on the right side of the housing 11. The drive mechanism 14 may have at least the telescopic mechanism 46.

The tilt mechanism 45 forms a so-called feed screw mechanism. Specifically, the tilt mechanism 45 includes a tilt motor unit 51, a tilt coupling portion 52, and a tilt movable portion 53. The tilt mechanism 45 switches between restriction and allowance of the steering device 1 pivoting around the axis O2 by driving the tilt motor unit 51.

The tilt motor unit 51 includes a tilt gear box 55 and a tilt motor 56.

The tilt gear box 55 is attached to a front end portion of the side frame 23a in a state of projecting outward from the side frame 23a in the left-right direction.

The tilt motor 56 is attached to the tilt gear box 55 from behind in a state where an output shaft (not represented) is directed forward. An output shaft of the tilt motor 56 is connected to a speed reduction mechanism (not represented) inside the tilt gear box 55.

The tilt coupling portion 52 includes a tilt wire 61, a tilt shaft 62, and a tilt coupling 63 that couples the tilt wire 61 and the tilt shaft 62 to each other.

The tilt coupling 63 is supported by a protruding piece 27 to be rotatable around an axis O3 extending in the left-right direction.

The tilt wire 61 bridges the tilt gear box 55 and the tilt coupling 63. The tilt wire 61 is configured to be rotatable in accordance with driving of the tilt motor 56. The tilt wire 61 is configured to be flexibly deformable. A connection member connecting the tilt gear box 55 and the tilt coupling 63 to each other is not limited to those which are flexibly deformable like the tilt wire 61. That is, depending on a layout of the tilt gear box 55 and the tilt coupling 63, the tilt gear box 55 and the tilt coupling 63 may be connected to each other by a connection member which does not flexibly deform.

The tilt shaft 62 bridges the tilt coupling 63 and the tilt movable portion 53. The tilt shaft 62 is rotated together with the tilt wire 61 in accordance with the driving of the tilt motor 56. A male screw portion is formed on an outer peripheral surface of the tilt shaft 62.

The tilt movable portion 53 includes a link member 70 and a tilt nut 71.

The link member 70 is formed in a U-shape which is open upward. The link member 70 has side walls 70a and 70b facing each other in the left-right direction. The side wall 70a is disposed between the holding cylinder 31 and the side frame 23a. The side wall 70b is disposed between the holding cylinder 31 and the side frame 23b.

The side wall 70a and the side frame 23a are coupled to each other by a first bolt 75 extending in the left-right direction. The side wall 70b and the side frame 23b are coupled to each other by a first bolt (not represented). In this manner, the link member 70 is supported by the tilt bracket 21 to be pivotable around an axis O4 extending in the left-tight direction.

The side wall 70a and the holding cylinder 31 are coupled to each other by a second bolt 76 extending in the left-right direction. The side wall 70b and the holding cylinder 31 are coupled to each other by the second bolt 76. The second bolt 76 is disposed behind the first bolt 75. In this manner, the link member 70 is supported by the holding cylinder 31 to be pivotable around an axis O5 extending parallel to the axis O4.

The tilt nut 71 is attached to a lower side of the side wall 70a. A female screw portion is formed on an inner peripheral surface of the tilt nut 71. The tilt shaft 62 meshes with the tilt nut 71. The tilt nut 71 is configured so that a position on the tilt shaft 62 can be changed in accordance with the rotation of the tilt shaft 62.

The telescopic mechanism 46 forms a so-called feed screw mechanism. Specifically, the telescopic mechanism 46 includes a telescopic motor unit (actuator) 81, a telescopic coupling portion 82, and a telescopic movable portion 83. The telescopic mechanism 46 switches between restriction and allowance of forward and rearward movements of the pipe 12 (steering shaft 13) with respect to the housing 11 by driving the telescopic motor unit 81.

The telescopic motor unit 81 includes a telescopic gear box 85 and a telescopic motor 86.

The telescopic gear box 85 is attached in a state of projecting outward from the front extending portion 32 in the left-right direction. Therefore, the telescopic motor unit 81 is configured to be pivotable around the axis O2 integrally with the housing body 22 by a driving force of the tilt mechanism 45.

The telescopic motor 86 is attached to the telescopic gear box 85 from behind in a state where an output shaft (not represented) is directed forward. An output shaft of the telescopic motor 86 is connected to a speed reduction mechanism inside the telescopic gear box 85. The telescopic motor unit 81 may be supported by the tilt bracket 21 via a wire.

Figure 4:
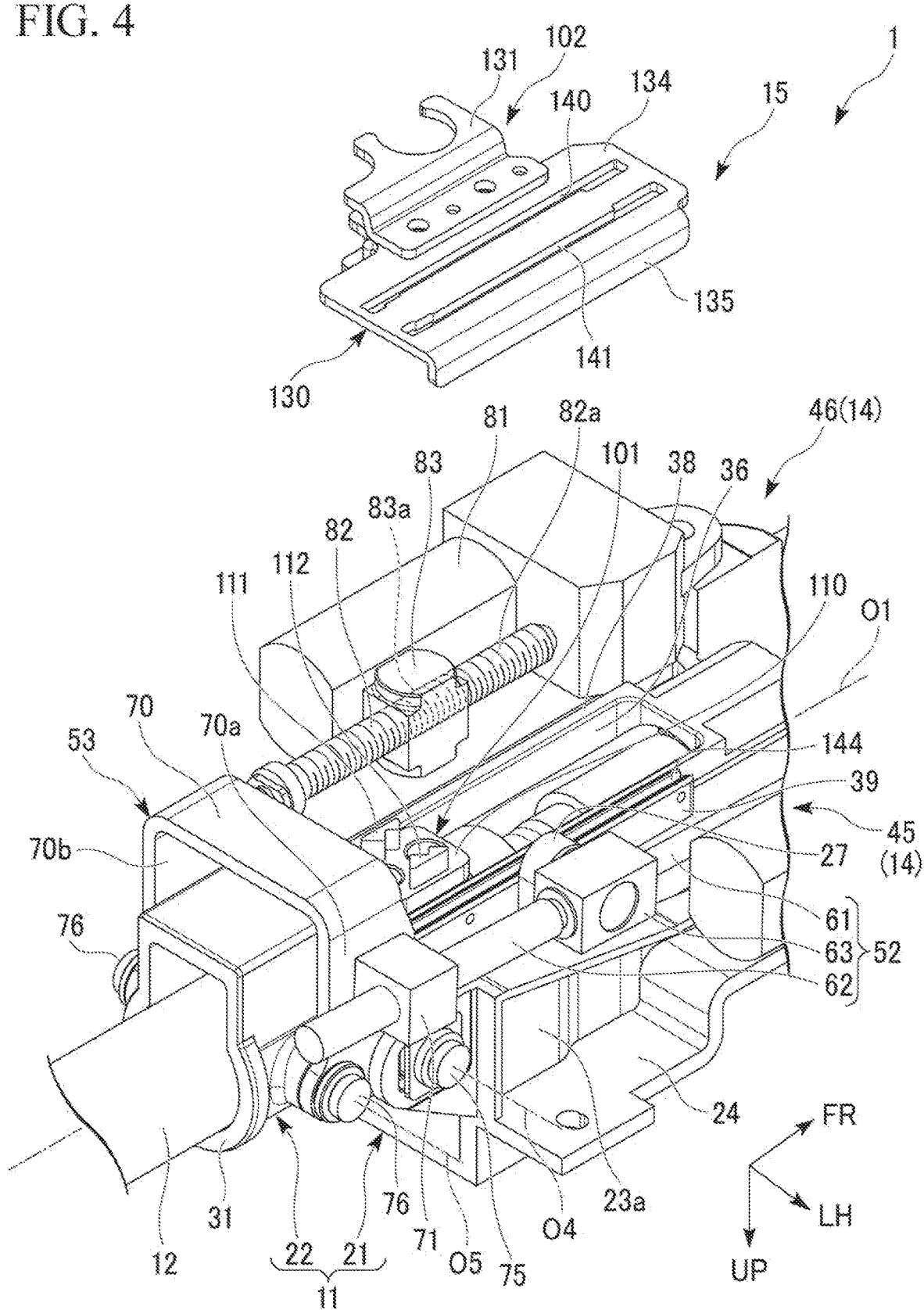
FIG. 4 is an exploded perspective view of a load absorbing mechanism.

FIG. 4 is an exploded perspective view of the load absorbing mechanism 15.

As represented in FIG. 4, the telescopic coupling portion 82 extends rearward from the telescopic gear box 85. The telescopic coupling portion 82 rotates around the axis in accordance with the driving of the telescopic motor 86. A male screw portion 82a is formed on an outer peripheral surface of the telescopic coupling portion 82.

The telescopic movable portion 83 is connected to the pipe 12 via the load absorbing mechanism 15. A female screw portion 83a is formed on an inner peripheral surface of the telescopic movable portion 83. The telescopic coupling portion 82 meshes with the telescopic movable portion 83. The telescopic movable portion 83 engages (is in contact) with the male screw portion 82a in the front-rear direction via the female screw portion 83a. The telescopic movable portion 83 is configured to be movable on the telescopic coupling portion 82 in accordance with the rotation of the telescopic coupling portion 82.

<Load Absorbing Mechanism 15>

As represented in FIGS. 3 and 4, the load absorbing mechanism 15 connects the telescopic movable portion 83 and the pipe 12 to each other. The load absorbing mechanism 15 transmits a driving force of the telescopic mechanism 46 to the pipe 12 during a telescopic operation when a load acting on the pipe 12 in the front-rear direction is smaller than a predetermined value and moves the pipe 12 together with the telescopic movable portion 83 in the front-rear direction with respect to the housing 11. When the load acting on the pipe 12 is equal to or greater than the predetermined value, at the secondary collision, the load absorbing mechanism 15 moves the pipe 12 in the front-rear direction with respect to the housing 11 independently of the telescopic mechanism 46. Specifically, the load absorbing mechanism 15 includes a hanger bracket 100, an energy absorbing (EA) block 101, and an EA plate 102.

The hanger bracket 100 is fixed to a lower portion of the pipe 12 in a front portion of the pipe 12. In the present embodiment, the hanger bracket 100 is fixed to the outer peripheral surface of the pipe 12 by means of welding. The hanger bracket 100 is disposed inside the slit 36.

The EA block 101 is provided below the hanger bracket 100. For example, the EA block 101 is integrally formed of a sintered material having an iron-based material. The EA block 101 includes a fixing plate 110, a first sliding portion 111, and a second sliding portion 112.

The fixing plate 110 overlaps the hanger bracket 100 from below. The fixing plate 110 is fixed to the hanger bracket 100 by means of screwing. The EA block 101 may be directly fixed to the pipe 12.

The first sliding portion 111 and the second sliding portion 112 face each other in the left-right direction. The first sliding portion 111 and the second sliding portion 112 protrude downward from the fixing plate 110. The respective sliding portions 111 and 112 protrude outward of the housing body 22 through the slit 36. In a plan view, the respective sliding portions 111 and 112 are formed line-symmetrically with respect to a symmetric line extending in the front-rear direction through a center of an extending portion 150 (to be described later). Therefore, in the following description, the first sliding portion 111 will be described as an example.

Figure 5:
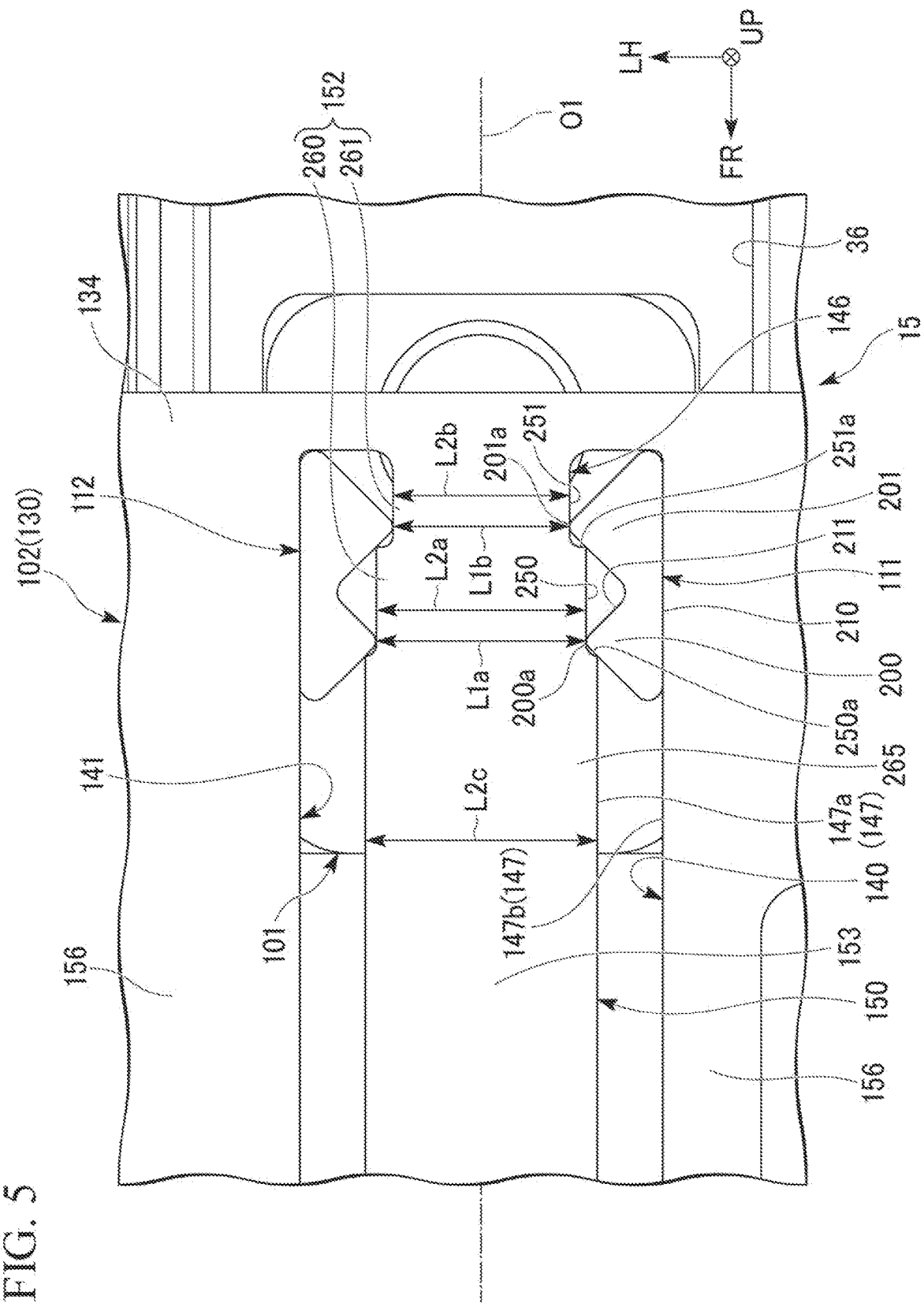
FIG. 5 is an enlarged view of the load absorbing mechanism.

FIG. 5 is an enlarged view of the load absorbing mechanism 15.

As represented in FIG. 5, the first sliding portion 111 includes a front pressing portion 200 and a rear pressing portion 201. The front pressing portion 200 is formed in a triangular shape in which a top surface 200a faces inward in the left-right direction. The rear pressing portion 201 is formed in a triangular shape in which a top surface 201a faces inward in the left-right direction. The lengths of the respective pressing portions 200 and 201 in the front-rear direction gradually decrease inward in the left-right direction. The top surface 200a of the front pressing portion 200 and the top surface 201a of the rear pressing portion 201 are formed on curved surfaces projecting inward in the left-right direction in a plan view.

The respective pressing portions 200 and 201 are connected in the front-rear direction. Surfaces (hereinafter, referred to as guide surfaces 210) of the respective pressing portions 200 and 201 which face outward in the left-right direction are flush with each other. The guide surface 210 is formed into a flat surface perpendicular to the left-right direction. The top surface 200a of the front pressing portion 200 is located outside the top surface 201a of the rear pressing portion 201 in the left-right direction. Therefore, in the respective sliding portions 111 and 112, when a distance in the left-right direction between the top surfaces 200a of the respective front pressing portions 200 is defined as L1a and a distance between the top surfaces 201a of the respective rear pressing portions 201 is defined as L1b, the distances are set to L1a>L1b. A portion located between the respective pressing portions 200 and 201 on a surface facing inward in the left-right direction in the first sliding portion 111 has a relief portion 211 formed by slopes of the respective pressing portions 200 and 201. The relief portion 211 is recessed outward in the left-right direction with respect to the top surfaces 200a and 201a. The guide surface 210 is not limited to the flat surface and may be a curved surface.

As represented in FIGS. 3 and 4, the EA plate 102 includes a main plate 130 and a sub plate 131.

The main plate 130 is formed in a crank shape in a front view when viewed in the front-rear direction. The main plate 130 is formed of a material (for example, SPHC) having rigidity lower than that of the EA block 101. The main plate 130 includes an attachment piece 132, a coupling piece 133, an operating piece 134, and a support piece 135.

The attachment piece 132 is formed in a plate shape while the up-down direction is set as the thickness direction. The attachment piece 132 is attached to the above-described telescopic movable portion 83 from above. The LA plate 102 is configured to be movable forward and rearward integrally with the telescopic movable portion 83.

The coupling piece 133 extends downward from an inner end edge of the attachment piece 132 in the left-right direction.

The operating piece 134 extends inward in the left-right direction from a lower end edge of the coupling piece 133. The operating piece 134 covers the pipe 12 from below. The rear end portion of the operating piece 134 overlaps the EA block 101 (sliding portions 111 and 112) in a plan view. A long hole (first long hole 140 and second long hole 141) is formed in the operating piece 134. Configurations of the respective long holes 140 and 141 will be described later.

The support piece 135 extends upward from an end edge of the operating piece 134 which is located on a side opposite to the coupling piece 133. An upper end portion of the support piece 135 is accommodated inside the above-described recess portion 39a. A guide rail 144 is provided inside the recess portion 39a. The guide rail 144 is formed in a U-shape which is open downward and extends in the front-rear direction inside the recess portion 39a. The guide rail 144 is fitted into the recess portion 39a to cover the inner surface of the recess portion 39a. The guide rail 144 is formed of a material (for example, a resin material) in which frictional resistance generated with the support piece 135 is lower than frictional resistance acting between the support piece 135 and the inner surface of the recess portion 39a. The support piece 135 is accommodated inside the above-described guide rail 144. That is, the guide rail 144 guides the movement in the front-rear direction while restricting the movement of the main plate 130 (EA plate 102) in the left-right direction with respect to the housing body 22.

The sub plate 131 connects the telescopic movable portion 83 and the operating piece 134 to each other. Specifically, an outer end portion of the sub plate 131 in the left-right direction is attached to the telescopic movable portion 83 from below. The sub plate 131 pinches the telescopic movable portion 83 with the attachment piece 132 in the up-down direction. An inner end portion of the sub plate 131 in the left-right direction is connected to the operating piece 134.

Figure 6:
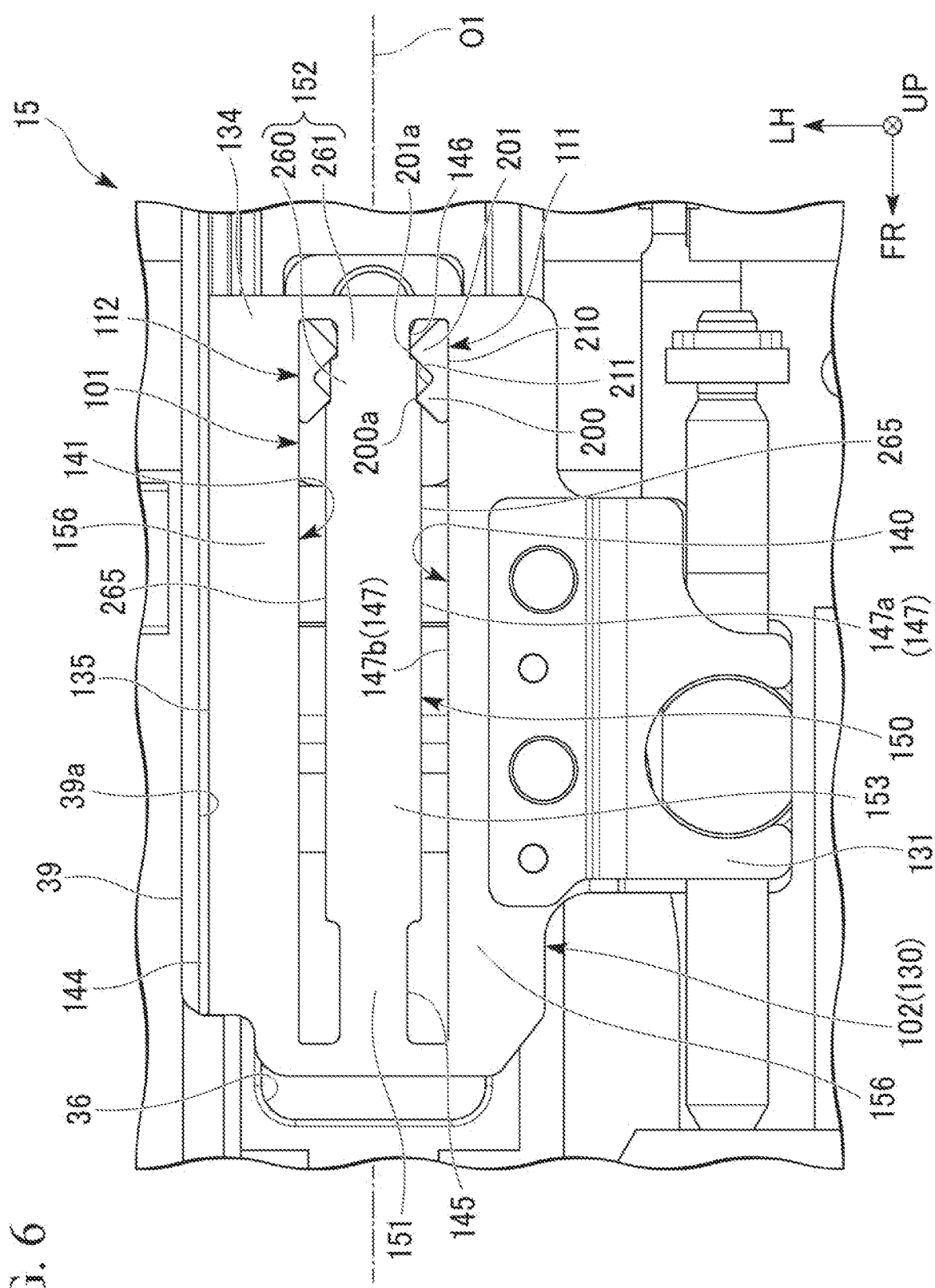
FIG. 6 is a view taken along an arrow VI in FIG. 3.

FIG. 6 is a view taken along an arrow VI in FIG. 3.

Here, as represented in FIGS. 5 and 6, the respective long holes 140 and 141 penetrate the operating piece 134 in the up-down direction and extend in the front-rear direction. The respective long holes 140 and 141 are formed line-symmetrically with respect to a symmetric line extending in the front-rear direction through the center of the extending portion 150 (to be described later) in a plan view. Therefore, in the following description, the first long hole 140 will be described as an example.

The first long hole 140 includes enlarged portions (front enlarged portion 145 and rear enlarged portion 146) located in both end portions in the front-rear direction and a transition portion 147 connecting the enlarged portions 145 and 146 to each other.

The transition portion 147 linearly extends in the front-rear direction. In the transition portion 147, an outward facing side surface 147a facing outward in the left-right direction and an inward facing side surface 147b facing inward in the left-right direction are formed into flat surfaces extending parallel to each other along the front-rear direction.

As represented in FIG. 6, the width (maximum width) of the front enlarged portion 145 in the left-right direction is wider than the width (maximum width) of the transition portion 147 in the left-right direction. The front enlarged portion 145 bulges inward in the left-right direction with respect to the outward facing side surface 147a of the transition portion 147.

As represented in FIG. 5, the rear enlarged portion 146 is formed in a stepped shape that gradually bulges inward in the left-right direction as the rear enlarged portion 146 is located rearward. The rear enlarged portion 146 includes a first fitting portion 250 and a second fitting portion 251. An outward facing side surface of an inner surface of the first fitting portion 250 which faces outward in the left-right direction is located inside the outward facing side surface 147a of the transition portion 147 in the left-right direction. The outward facing side surface of the first fitting portion 250 is formed into a flat surface linearly extending in the front-rear direction. A boundary surface 250a between the outward facing side surface of the first fitting portion 250 and the outward facing side surface 147a of the transition portion 147 on the inner surface of the first fitting portion 250 is formed on a flat surface perpendicular to the front-rear direction. The boundary surface 250a may be an inclined surface extending outward in the left-right direction as the boundary surface 250a is directed forward.

The outward facing side surface of the inner surface of the second fitting portion 251 which faces outward in the left-right direction is located inside the outward facing side surface of the first fitting portion 250 in the left-right direction. The outward facing side surface of the second fitting portion 251 is formed into a flat surface linearly extending in the front-rear direction. A boundary surface 251a between the outward facing side surface of the first fitting portion 250 and the outward facing side surface of the second fitting portion 251 on the inner surface of the second fitting portion 251 is formed into a flat surface perpendicular to the front-rear direction. The boundary surface 251a may be an inclined surface extending outward in the left-right direction as the boundary surface 251a is directed forward.

The first sliding portion 111 is fitted into the rear enlarged portion 146. The front pressing portion 200 of the first sliding portion 111 is fitted into the first fitting portion 250. In the front pressing portion 200, the top surface 200a is close to or in contact with the outward facing side surface of the first fitting portion 250, and the guide surface 210 is close to or in contact with the inward facing side surface of the first fitting portion 250.

The rear pressing portion 201 of the first sliding portion 111 is fitted into the second fitting portion 251. In the rear pressing portion 201, the top surface 201a is close to or in contact with the outward facing side surface of the second fitting portion 251, and the guide surface 210 is close to or in contact with the inward facing side surface of the second fitting portion 251.

As represented in FIGS. 4, 5, and 6, a portion of the operating piece 134 which is located between the respective long holes 140 and 141 forms the extending portion 150 extending in the front-rear direction. The extending portion 150 includes a front constriction portion 151, a rear constriction portion 152, and a wide portion 153. The front constriction portion 151 is a portion located between the front enlarged portions 145. The rear constriction portion 152 is a portion located between the rear enlarged portions 146. The rear constriction portion 152 includes a first constriction portion 260 located between the first fitting portions 250 and a second constriction portion 261 located between the second fitting portions 251.

A width L2a of the first constriction portion 260 in the left-right direction is set to be larger than a distance L1b between the rear pressing portions 201, and to be equal to or smaller than a distance (first distance) L1a between the front pressing portions 200. A width L2b of the second constriction portion 261 in the left-right direction is set to be equal to or smaller than a distance (first distance) L1b between the rear pressing portions 201.

A width L2c of the wide portion 153 is wider than the width L2a of the first constriction portion 260 and the distance L a between the front pressing portions 200. A portion bulging outward in the left-right direction with respect to the respective constriction portions 260 and 261 in the wide portion 153 forms a deformable portion 265. The deformable portion 265 overlaps the top surfaces 200a and 201a of the pressing portions 200 and 201 in a front view. The deformable portion 265 is configured to be plastically deformable in such a manner that the respective sliding portions 111 and 112 (respective pressing portions 200 and 201) slide when a predetermined load is input forward to the EA block 101 at the secondary collision. Therefore, the deformable portion 265 is not deformable when the load acting on the EA block 101 is smaller than a predetermined value (for example, during the telescopic operation). When the load acting on the pipe 12 is smaller than the predetermined value, the relative movement of the EA block 101 with respect to the EA plate 102 is restricted in a state where the respective sliding portions 111 and 112 are fitted into the respective rear enlarged portions 146.

A portion of the operating piece 134 which is located on a side opposite to the extending portion 150 (outside in the left-right direction) with respect to the respective long holes 140 and 141 forms a guide portion 156 extending in the front-rear direction. The guide portion 156 is located outside the respective sliding portions 111 and 112 in the left-right direction and restricts outward displacement of the respective sliding portions 111 and 112 in the left-right direction. The side surface of the guide portion 156 which faces inward in the left-right direction (inward facing side surface of the long holes 140 and 141 (for example, the inward facing side surface 147b)) faces the above-described guide surface 210. The guide portion 156 and the guide surface 210 may be in contact with each other.

[Operation]

Next, an operation of the above-described steering device 1 will be described. In the following description, a tilt operation, a telescopic operation, and a collapse stroke will be mainly described.

<Tilt Operation>

As represented in FIG. 1, in the tilt operation, a driving force of the tilt motor 56 is transmitted to the housing body 22 via the link member 70 so that the housing body 22 pivots around the axis O2. Specifically, when the steering wheel 2 is adjusted upward, the tilt motor 56 is driven to rotate the tilt wire 61 and the tilt shaft 62 in a first direction (loosening direction of the tilt nut 71), for example. When the tilt shaft 62 rotates in the first direction, the tilt nut 71 moves rearward with respect to the tilt shaft 62. Since the tilt nut 71 moves rearward, the housing body 22 pivots upward around the axis O2 with respect to the tilt bracket 21. As a result, the steering wheel 2 pivots upward around the axis O2 together with the housing body 22, the pipe 12, and the steering shaft 13.

When the steering wheel 2 is adjusted downward, the tilt shaft 62 is rotated in a second direction (tightening direction of the tilt nut 71). Then, the tilt nut 71 moves forward with respect to the tilt shaft 62. Since the tilt nut 71 moves forward, the housing body 22 pivots downward around the axis O2 with respect to the tilt bracket 21. As a result, the steering wheel 2 pivots downward around the axis O2 together with the housing body 22, the pipe 12, and the steering shaft 13.

<Telescopic Operation>

During the telescopic operation, the driving force of the telescopic motor 86 is transmitted to the pipe 12 via the EA plate 102 and the EA block 101 so that the pipe 12 and the inner shaft 42 move forward and rearward with respect to the housing 11 and the outer shaft 43. When the steering wheel 2 is moved rearward, the telescopic motor 86 is driven to rotate the telescopic coupling portion 82 in the first direction (loosening direction of the telescopic movable portion 83), for example. When the telescopic coupling portion 82 rotates in the first direction, the telescopic movable portion 83 and the EA plate 102 move rearward with respect to the telescopic coupling portion 82. The driving force of the EA plate 102 is transmitted to the EA block 101. In this case, the relative movement of the EA block 101 with respect to the EA plate 102 is restricted in a state where the respective sliding portions 111 and 112 are fitted into the respective rear enlarged portions 146. Therefore, the driving force of the EA plate 102 is transmitted to the pipe 12 via the EA block 101. As a result, the pipe 12 moves rearward together with the inner shaft 42 so that the steering wheel 2 moves rearward.

When the steering wheel 2 is moved forward, the telescopic coupling portion 82 is rotated in the second direction, for example. When the telescopic coupling portion 82 rotates in the second direction (tightening direction of the telescopic movable portion 83), the telescopic movable portion 83 and the EA plate 102 move forward with respect to the telescopic coupling portion 82. As the EA plate 102 moves forward, the driving force of the FA plate 102 is transmitted to the pipe 12 via the EA block 101. In this manner, the pipe 12 moves forward so that the steering wheel 2 moves forward.

<At Time of Secondary Collision>

Next, an operation at the secondary collision will be described.

As represented in FIG. 6, at the secondary collision (when a collision load is equal to or greater than a predetermined value), the steering wheel 2 moves forward with respect to the housing body 22 and the outer shaft 43 together with the pipe 12, the EA block 101, and the inner shaft 42.

Figure 7:
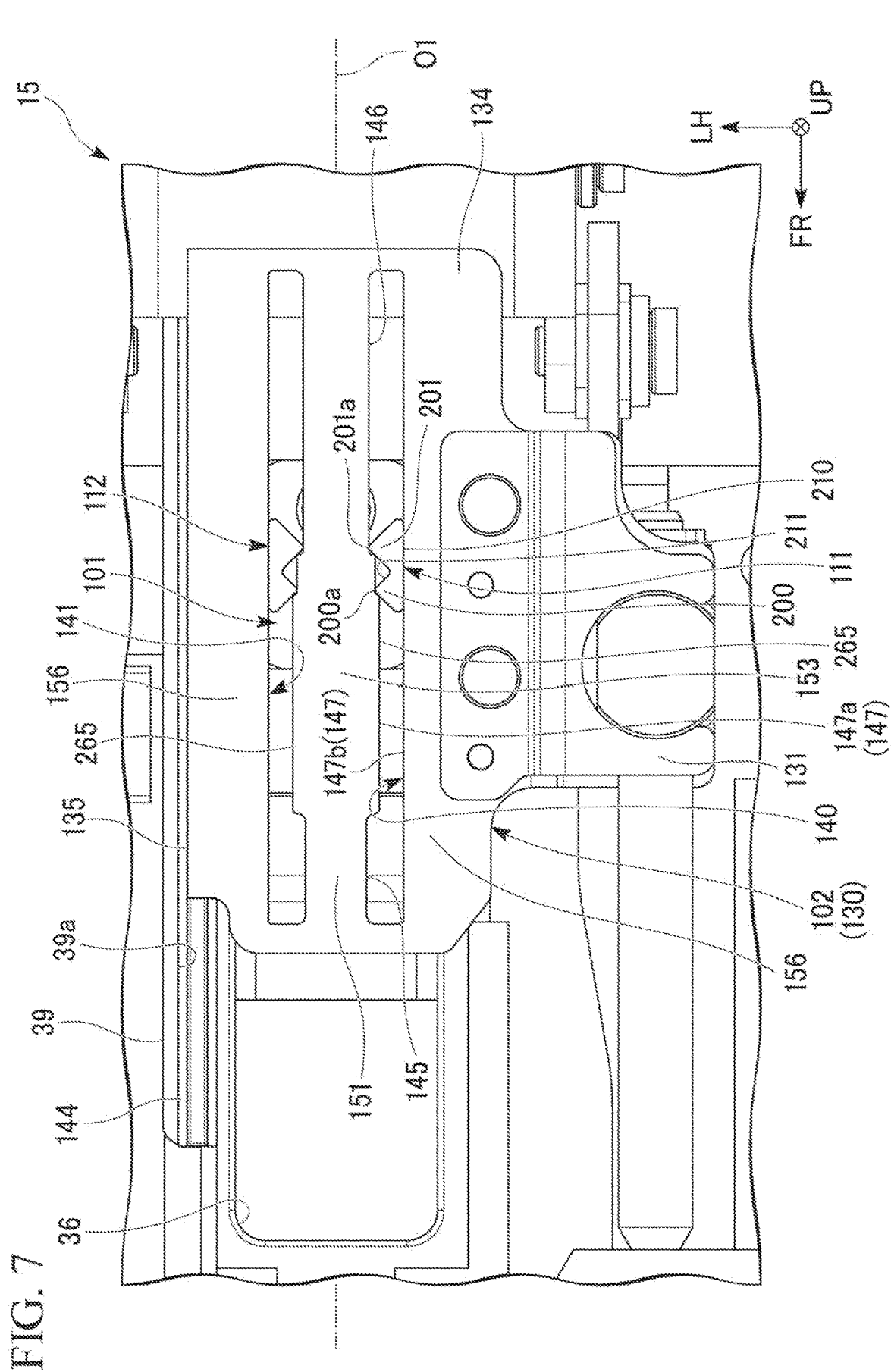
FIG. 7 is a view for describing an operation at the time of a secondary collision.

FIG. 7 is a view for describing the operation at the secondary collision.

As represented in FIGS. 6 and 7, at the secondary collision, a forward collision load acts on the pipe 12 via the steering wheel 2. In this case, the collision load acts on the EA plate 102 via the EA block 101. However, in the present embodiment, the female screw portion 83a of the telescopic movable portion 83 and the male screw portion 82a of the telescopic coupling portion 82 engage (are in contact) with each other in the front-rear direction. Accordingly, the forward movement of the EA plate 102 with respect to the housing 11 is restricted. Therefore, the steering shaft 13, the pipe 12, the hanger bracket 100, and the EA block 101 try to move forward with respect to the EA plate 102 and the housing 11.

In the present embodiment, when the respective sliding portions 111 and 112 move forward with respect to the EA plate 102, the respective pressing portions 200 and 201 slide on the outer surface of the extending portion 150 to move while squeezing the extending portion 150. When the respective front pressing portions 200 of the respective sliding portions 11 and 112 slide on the outer surface (outward facing side surface of the transition portion 147) of the wide portion 153 via the boundary surface 250a, the deformable portion 265 is plastically deformed (crushed) inward in the left-right direction. Therefore, in the wide portion 153, the width of a portion through which the front pressing portion 200 passes decreases, compared to a portion located in front of the front pressing portion 200. In this case, the width of the portion of the wide portion 153 through which the front pressing portion 200 passes is equal to the distance L1a between the top surfaces 200a of the front pressing portions 200.

The rear pressing portion 201 of the respective sliding portions 111 and 112 enters the inside of the first fitting portion 250 via the boundary surface 251a. The distance L1b between the top surfaces 201a of the rear pressing portions 201 is narrower than the width L2a of the first constriction portion 261. Therefore, when the rear pressing portion 201 slides on the outer surface of the first constriction portion 260, the first constriction portion 260 is plastically deformed inward in the left-right direction. Thereafter, the rear pressing portion 201 enters the inside of the transition portion 147, and slides on the portion through which the front pressing portion 200 passes, on the outer surface of the wide portion 153. Here, the distance L1b between the top surfaces 201a in the rear pressing portions 201 is narrower than the distance L1a between the top surfaces 200a in the front pressing portions 200. Therefore, the rear pressing portion 201 moves forward while the portion through which the front pressing portion 200 passes in the wide portion 153 is plastically deformed (crushed) inward in the left-right direction.

In this way, in a process in which the steering shaft 13 moves forward with respect to the EA plate 102 and the housing 11, an impact load applied to a driver at the secondary collision is cushioned by a load generated when the respective pressing portions 200 and 201 squeeze the extending portion 150. A timing at which the front pressing portion 200 reaches the boundary surface 250a and a timing at which the rear pressing portion 201 reaches the boundary surface 251a (timing at which an initial load is generated due to crushing of the extending portion 150 crushed by the front pressing portion 200 and a timing at which an initial load is generated due to crushing of the extending portion 150 crushed by the rear pressing portion 201) may be the same as each other, or may be different from each other. When the above-described timings are different from each other, a starting load during the collapse stroke can be reduced, and load fluctuation can be prevented.

A load generated between the EA block 101 and the EA plate 102 can be adjusted by changing a difference between the distances L1a and L1b between the respective sliding portions 111 and 112 and the width L2c of the wide portion 153, or the thickness of the wide portion 153. At the secondary collision, in addition to the load when the extending portion 150 is squeezed by the respective sliding portions 111 and 112, for example, the impact load may be cushioned by the sliding resistance between the outer peripheral surface of the pipe 12 and the inner peripheral surface of the holding cylinder 31. A paint having a high friction coefficient may be applied to the sliding portion between the outer peripheral surface of the pipe 12 and the inner peripheral surface of the holding cylinder 31, or uneven processing may be applied thereto.

In this way, in the present embodiment, the sliding portions 111 and 112 are configured to include the front pressing portion 200 and the rear pressing portion 201 located behind the front pressing portion 200. The distance (first distance) L1b between the rear pressing portions 201 is configured to be shorter than the distance (second distance) L1a between the front pressing portions 200 in the distance between the facing sliding portions 111 and 112.

According to this configuration, the impact load can be cushioned by plastically deforming the extending portion 150 when each of the front pressing portion 200 and the rear pressing portion 201 slides on the outer surface of the extending portion 150. In this case, in order to secure the absorbed energy with respect to the impact load, the tightening allowance between the respective pressing portions 200 and 201 and the extending portion 150 can be decreased, compared to a case of increasing the tightening allowance between one pressing portion and the extending portion. The impact load applied to the sliding portions 111 and 112 can be distributed to the front pressing portion 200 and the rear pressing portion 201. Therefore, the sliding portions 111 and 112 as a whole can cope with a higher load. As a result, the absorbed energy absorbed by the load absorbing mechanism 15 can be stabilized over the entire region of the collapse stroke. Since the impact load applied to the sliding portions 111 and 112 is distributed to the front pressing portion 200 and the rear pressing portion 201, strength of the sliding portions 111 and 112 can be secured.

In the present embodiment, the telescopic motor unit (actuator) 81 of the telescopic mechanism 46 is fixed to the housing 1 (housing body 22). Accordingly, the telescopic motor unit 81 does not move during the telescopic operation and at the secondary collision. Therefore, it is not necessary to secure a movement space of the telescopic motor unit 81 around the steering device 1. In this manner, layout designing can be improved.

In particular, in the steering device 1, a feed screw mechanism is adopted as the telescopic mechanism 46. Therefore, it is easy to secure an engagement force between the male screw (engaging portion) 82a of the telescopic coupling portion (shaft) 82 and the female screw (engaging portion) 83a of the telescopic movable portion (nut) 83. In the steering device 1, it is easy to adjust the stroke of the pipe 12 with respect to the rotation amount of the telescopic motor unit 81 during the telescopic operation.

In the present embodiment, the top surfaces (front contact portion and rear contact portion) 200a and 201a of the respective pressing portions 200 and 201 are configured to form curved surfaces projecting toward the extending portion 150.

According to this configuration, during the collapse stroke generated due to the secondary collision, when the sliding portions 111 and 112 slide on the extending portion 150, it is possible to prevent the pressing portions 200 and 201 and the extending portion 150 from being caught on each other. In this manner, the sliding portions 111 and 112 can be smoothly moved on the extending portion 150, and the load fluctuations can be gentle during the collapse stroke. In this manner, the impact load can be efficiently cushioned over the entire collapse stroke. Therefore, the impact absorbing performance can be improved.

In the present embodiment, the EA plate 102 is configured to include the guides (first guide and second guide) 156 on a side opposite to the extending portion 150 with respect to the respective sliding portions 111 and 112.

According to this configuration, the respective sliding portions 111 and 112 can smoothly move forward along the extending portion 150 during the collapse stroke generated due to the secondary collision. When the respective sliding portions 111 and 112 try to move or deform outward in the left-right direction due to the load acting between the extending portion 150 and the respective sliding portions 111 and 112, the movement or the deformation of the respective sliding portions 111 and 112 can be restricted by the guide 156. Therefore, desired impact absorbing performance can be secured. In the present embodiment, in a case of "the movement or the deformation", for example, the movement means that the extending portion 150 is displaced to a side separated from one sliding portion, or the sliding portions 111 and 112 are displaced to a side separated from the extending portion 150 without plastic deformation. For example, the deformation means that the extending portion 150 is bent to a side separated from one sliding portion, or the sliding portions 111 and 112 are bent to a side separated from the extending portion 150 without plastic deformation. The present embodiment may be configured in any way as long as at least one of the above-described movement and deformation can be restricted.

In the present embodiment, the facing surface facing the guide 156 in the sliding portions 111 and 112 is configured to have the guide surface 210 extending in the front-rear direction.

According to this configuration, during the collapse stroke generated due to the secondary collision, the sliding portions 111 and 112 are smoothly guided along the inward facing side surface of the guide 156.

In the present embodiment, the extending portion 150 is configured to include the first constriction portion (first narrow portion) 260 formed so that the width L2a is larger than the distance L1b and equal to or smaller than the distance L1a, the second constriction portion (second narrow portion) 261 formed so that the width L2b is equal to or smaller than the distance L1b, and the wide portion 153 formed so that the width L2c is larger than the distance L1a.

According to this configuration, during the collapse stroke generated due to the secondary collision, the wide portion 153 is plastically deformed by the front pressing portions 200 of the respective sliding portions 111 and 112, and thereafter, the portion through which the front pressing portion 200 passes is plastically deformed by the rear pressing portion 201. In this manner, it is possible to prevent an increase in the tightening allowance between the respective pressing portions 200 and 201 and the extending portion 150. The absorbed energy with respect to the impact load is secured by both the respective pressing portions 200 and 201 over the entire region of the collapse stroke. Therefore, the impact absorbing performance can be secured.

Modification Example

Figure 8:
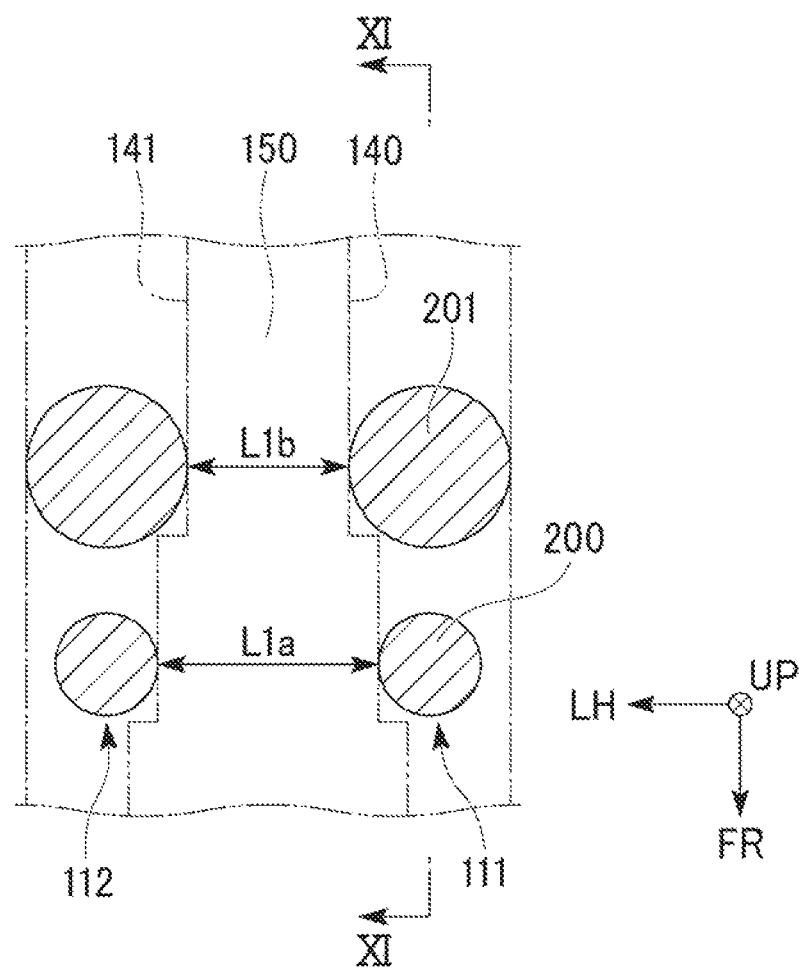
FIG. 8 is a bottom view of an EA block according to a modification example.

In the above-described embodiment, a configuration has been described in which the respective pressing portions 200 and 201 are connected to each other in the front-rear direction. However, the present disclosure is not limited to this configuration. As in the sliding portions 111 and 112 represented in FIG. 8, the respective pressing portions 200 and 201 may be separated from each other in the front-rear direction. In the represented example, the respective pressing portions 200 and 201 are formed in a perfect circle shape having different outer diameters in a plan view. In addition, in the above-described embodiment and modification example, the outer shapes of the respective pressing portions 200 and 201 in a plan view can be appropriately changed to a triangular shape, a rectangular shape, a semicircular shape, or an elliptical shape.

In the above-described embodiment, a configuration has been described in which the respective sliding portions 111 and 112 have cross-sectional areas perpendicular to the up-down direction which are uniform over the entire region in the up-down direction. However, the present disclosure is not limited to this configuration. For example, the cross-sectional areas of the respective sliding portions 111 and 112 may be formed to be different in the up-down direction. In this case, the respective sliding portions 111 and 112 may be formed so that the cross-sectional areas decrease upward and may be formed so that the cross-sectional area of the central portion in the up-down direction is smaller than the cross-sectional area of both upper and lower end portions.

In the above-described embodiment, a configuration has been described in which the respective sliding portions 111 and 112 are formed line-symmetrically. However, without being limited to this configuration, the sliding portions 111 and 112 may be formed asymmetrically in the left-right direction.

Second Embodiment

Figure 9:
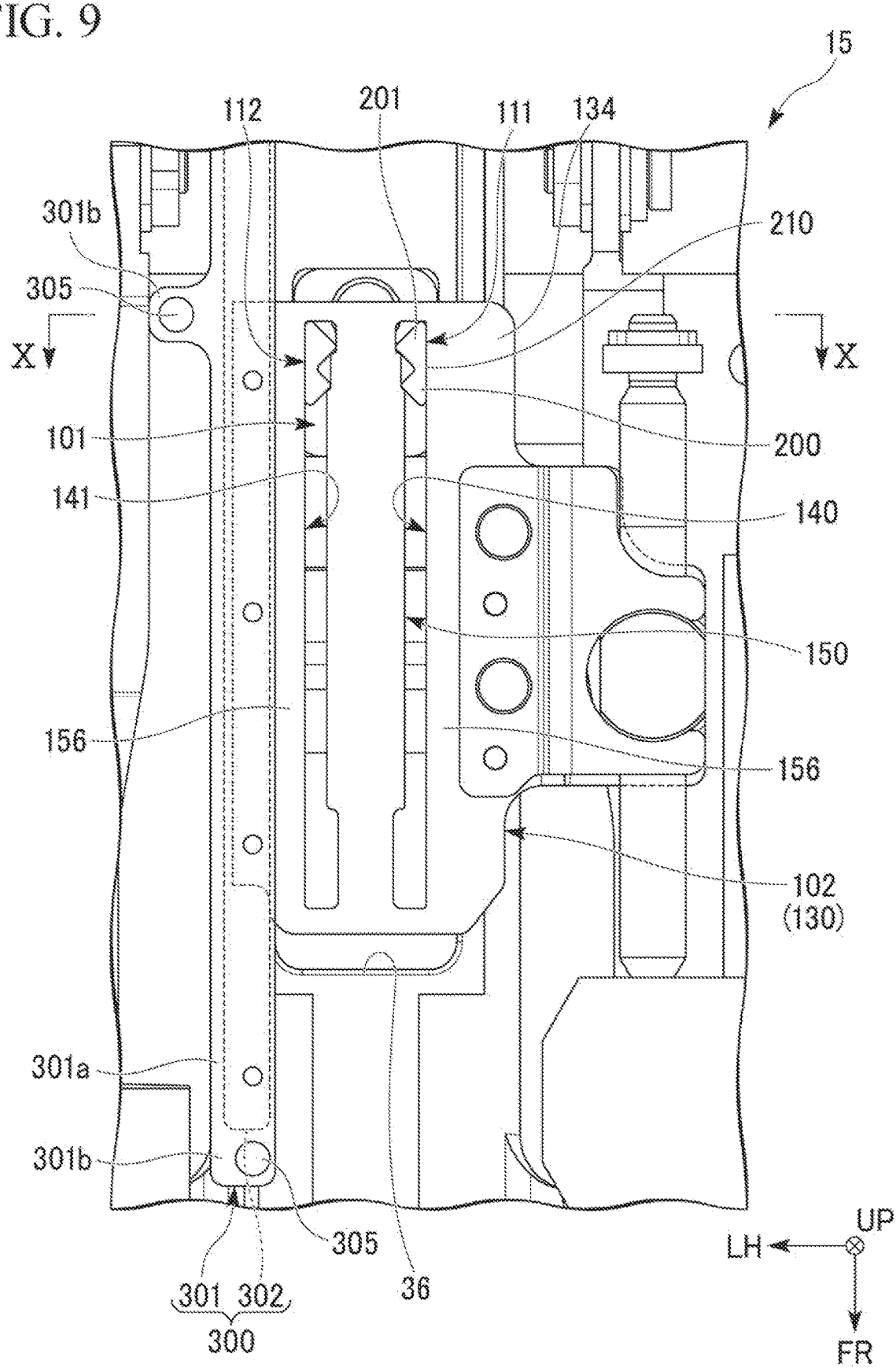
FIG. 9 is an enlarged bottom view of a steering device according to a second embodiment.
Figure 10:
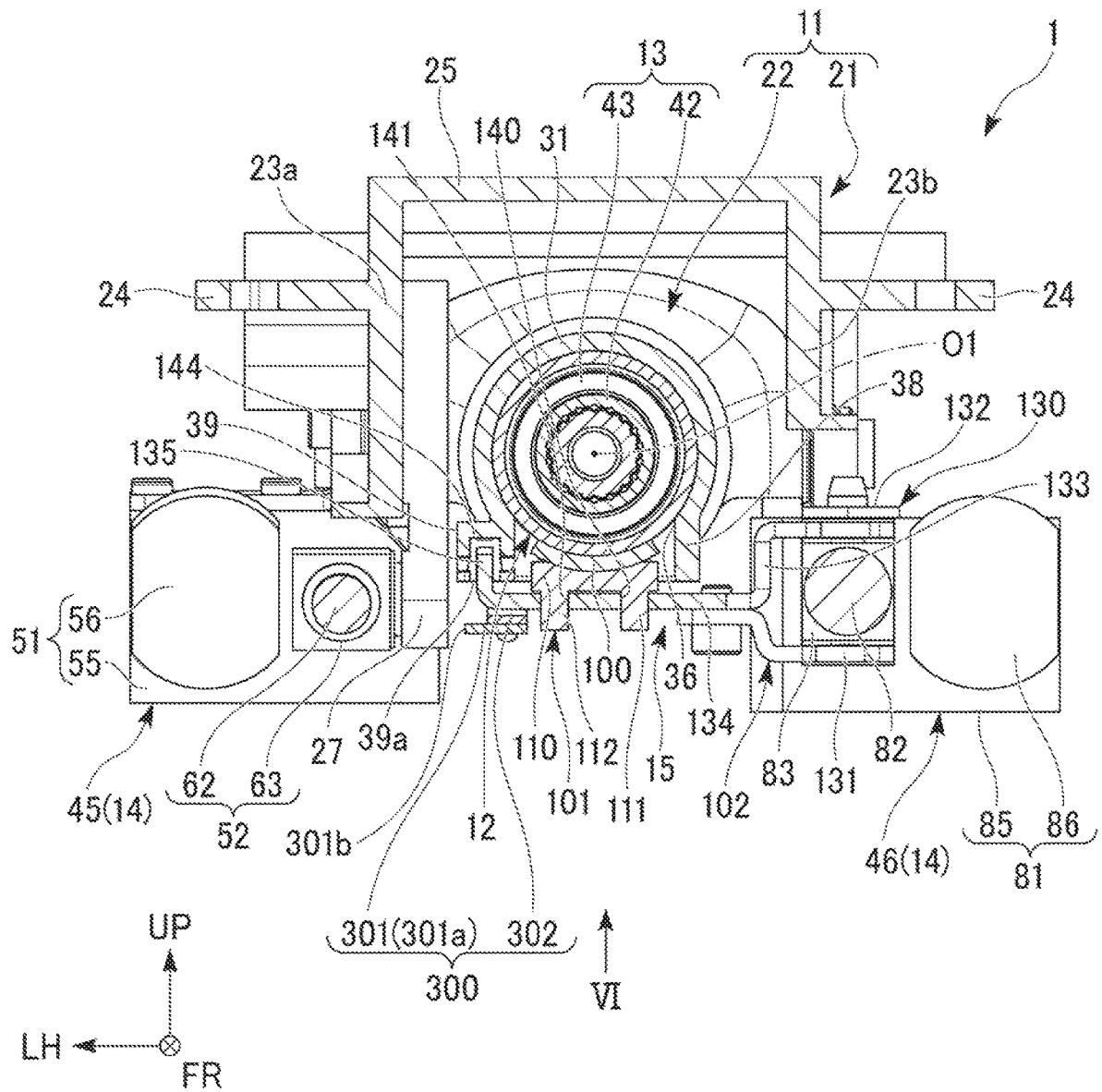
FIG. 10 is a view representing the steering device according to the second embodiment and is a sectional view corresponding to FIG. 3.

FIG. 9 is an enlarged bottom view of the steering device 1 according to a second embodiment. FIG. 10 is a view representing the steering device 1 according to the second embodiment and is a sectional view corresponding to FIG. 3.

In the steering device 1 represented in FIGS. 9 and 10, the load absorbing mechanism 15 includes an EA cover (restriction member) 300. The EA cover 300 restricts downward movement of the EA plate 102 with respect to the housing body 22 (sliding portions 111 and 112). The EA cover 300 is disposed on a side opposite to the telescopic mechanism 46 side with respect to the axis O1 in a lower portion of the housing body 22. The EA cover 300 covers a portion of the EA plate 102 from below.

The EA cover 300 includes a restriction plate 301 and a sliding plate 302.

The restriction plate 301 is formed of a material (for example, a metal material) having higher rigidity than that of the sliding plate 302. The restriction plate 301 extends in the front-rear direction while the up-down direction is used as the thickness direction. The restriction plate 301 includes an overlapping piece 301a and an attachment piece 301b.

The overlapping piece 301a extends in the front-rear direction below the second protruding wall 39. The overlapping piece 301a overlaps a left end portion (end portion on a side opposite to the telescopic mechanism 46) of the operating piece 134 from below. In the represented example, the overlapping piece 301a overlaps the guide 156 on the left side with respect to the extending portion 150. A length of the overlapping piece 301a in the front-rear direction is longer than that of the EA plate 102 (operating piece 134).

The attachment piece 301b projects outward or forward in the left-right direction from the overlapping piece 301a. The attachment piece 301b is fixed to the housing body 22 in a portion deviating from an operation locus of the EA plate 102 during the telescopic operation. The attachment piece 301b is fixed to the housing body 22 by a bolt 305, for example.

The sliding plate 302 overlaps an upper surface of the overlapping piece 301a. The sliding plate 302 is formed of a material (for example, a resin material) in which frictional resistance generated with the operating piece 134 is smaller than frictional resistance acting between the operating piece 134 and the restriction plate 301. The sliding plate 302 is fixed to the overlapping piece 301a. As a method of fixing the sliding plate 302, a pin may be press-fitted into the overlapping piece 301a. A pin having a hook claw may be locked and fixed to the overlapping piece 301a or may be fixed by adhesion.

As represented in FIG. 10, the sliding plate 302 is located between the overlapping piece 301a and the operating piece 134. An upper surface of the sliding plate 302 is close to or in contact with a lower surface of the operating piece 134. The EA cover 300 may be configured not to include the sliding plate 302.

In the steering device 1 of the present embodiment, when the pipe 12 moves in the front-rear direction together with the inner shaft 42 during the telescopic operation, the EA plate 102 moves in the front-rear direction with respect to the EA cover 300. The sliding plate 302 may be in contact with the operating piece 134. In this case, a lower surface of the operating piece 134 slides on the sliding plate 302 during the telescopic operation.

According to this configuration, at the secondary collision, when the load acting between the sliding portions 111 and 112 and the extending portion 150 increases, the EA plate 102 is pressed downward by the respective sliding portions 111 and 112. Then, in the EA plate 102, the first sliding portion 111 tries to be separated from the first long hole 140, and the second sliding portion 112 tries to be separated from the second long hole 141. In this case, the operating piece 134 comes into contact with the EA cover 300 via the sliding plate 302. In this manner, the downward movement of the EA plate 102 with respect to the housing body 22 (sliding portions 111 and 112) is restricted. As a result, the sliding portions 111 and 112 can be prevented from being separated from the EA plate 102, and absorbed energy absorbed by the load absorbing mechanism 15 can be stabilized over an entire region of the collapse stroke.

In the steering device 1 of the present embodiment, the resin sliding plate 302 is disposed between the metal restriction plate 301 and the operating piece 134. In this manner, abnormal noise or wear occurring due to contact between the metal materials during telescopic operation can be prevented.

Hitherto, the preferred embodiments according to the present disclosure have been described. However, the present disclosure is not limited to the embodiments. Additions, omissions, substitutions, and other modifications of the configurations can be made within the scope not departing from the concept of the present disclosure. The present disclosure is not limited by the above-described configurations and is limited only by the appended claims.

For example, in the above-described embodiment, a configuration has been described in which the axis O1 intersects the front-rear direction. However, the present disclosure is not limited to the configuration. The axis O1 may coincide with the front-rear direction of the vehicle.

In the above-described embodiment, a case has been described where the telescopic mechanism 46 is the feed screw mechanism. However, the present disclosure is not limited to the configuration. For example, the telescopic mechanism 46 may adopt a gear.

In the above-described embodiment, a configuration has been described in which the two sliding portions 111 and 112 have the front pressing portion 200 and the rear pressing portion 201. However, the present disclosure is not limited to this configuration. The front pressing portion 200 and the rear pressing portion 201 may be configured to have any one of the sliding portions. The respective sliding portions may have three or more pressing portions in the front-rear direction.

In the above-described embodiment, a case has been described where the portion located between the long holes 140 and 141 serves the extending portion 150 and the portion located outside the long holes 140 and 141 in the left-right direction serves as the guide 156. However, the present disclosure is not limited to this configuration. The FA plate 102 may be configured without the long holes 140 and 141 or the guide 156 as long as the EA plate 102 has at least the extending portion 150.

In the above-described embodiment, a configuration has been described in which the EA plate 102 bridges the telescopic mechanism 46 (telescopic movable portion 83) and the housing body 22 (protruding wall 39). However, the present disclosure is not limited to this configuration. The EA plate 102 may be cantilevered and supported by the telescopic mechanism 46.

In the above-described embodiment, a configuration has been described in which the extending portion 150 is disposed in one row. However, the present disclosure is not limited to this configuration. For example, a plurality of the extending portions 150 may be provided in the left-right direction or in the up-down direction. The sliding portion can be provided depending on the number of extending portions 150.

In the above-described embodiment, a case has been described where the EA block 101 (sliding portions 111 and 112) is provided on the pipe 12 side, and the EA plate 102 (extending portion 150) is provided on the housing body 22 side. However, the present disclosure is not limited to this configuration. For example, the EA plate 102 may be provided on the pipe 12 side, and the EA block 101 may be provided on the housing body 22 side.

In the above-described embodiment, a configuration has been described in which the pressing portions 200 and 201 have the curved surfaces (top surfaces 200a and 201a). However, the present disclosure is not limited to this configuration.

In the above-described embodiment, a configuration has been described in which only the EA plate 102 plastically deforms. However, a configuration may be adopted so that at least one of the EA plate 102 and the EA block 101 plastically deforms in a process in which the sliding portions 111 and 112 slide on the extending portion 150.

Figure 11:
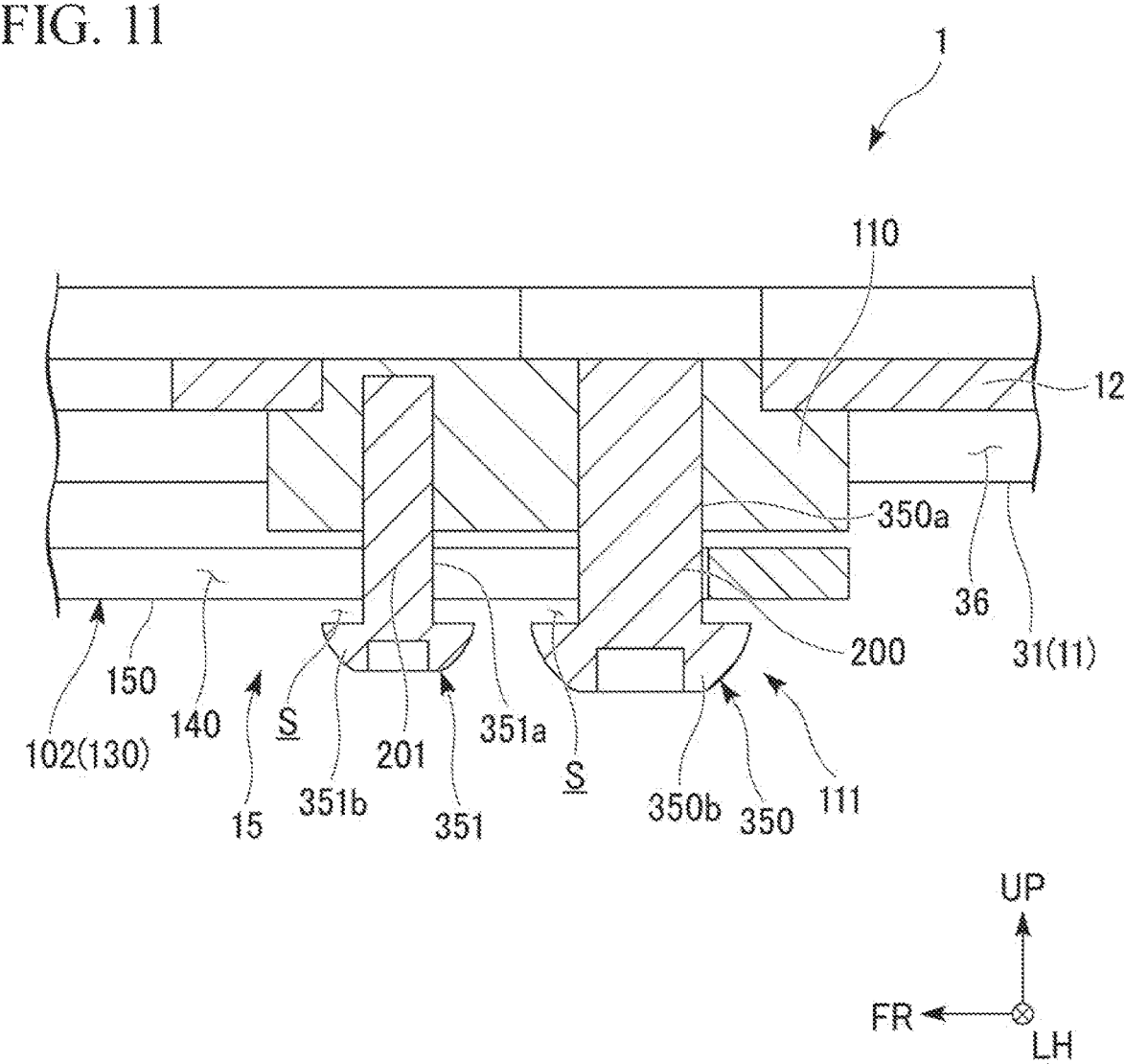
FIG. 11 is a view representing a steering device according to a modification example and is a sectional view corresponding to line XI-XI in FIG. 8.

In the above-described embodiment, a configuration has been described in which the sliding portions 111 and 112 are integrally formed in the fixing plate 110. However, the present disclosure is not limited to this configuration. For example, the sliding portion may be formed in a bolt shape and may be fastened to the fixing plate 110 from the opposite side (lower side) across the EA plate 102 with respect to the fixing plate 110. In this case, a portion sliding with the extending portion 150 in a shaft portion of one bolt may have the front pressing portion 200 and the rear pressing portion 201. As represented in FIG. 11, a bolt 350 having the front pressing portion 200 in a shaft portion 350a and a bolt 351 having the rear pressing portion 201 in a shaft portion 351a each may be fastened to the fixing plate 110. A portion located inside the first long hole 140 (or the second long hole 141) in the shaft portion 350a functions as the front pressing portion 200. A portion located inside the first long hole 140 (or the second long hole 141) in the shaft portion 351a functions as the rear pressing portion 201. A cross-sectional shape of the pressing portions 200 and 201 in the shaft portion 350a may be any shape other than a perfect circle.

A head portion 350b of the bolt 350 is enlarged with respect to the shaft portion 350a. A head portion 3511b of the bolt 351 is enlarged with respect to the shaft portion 351b. In the head portions 350b and 351b, a portion of the outer peripheral portion overlaps the EA plate 102 (extending portion 150 or guide 156) from below. The head portion 350b of the bolt 350 and the head portion 351b of the bolt 351 function as restriction members for restricting the movement of the EA plate 102 (extending portion 150) in the up-down direction with respect to the sliding portions 111 and 112. In the example in FIG. 11, a gap S is provided between the head portions 350b and 351b and the EA plate 102. Therefore, it is possible to prevent a deformation mark (burr) generated by the shaft portions 350a and 351a squeezing the extending portion 150 from coming into contact with the head portions 350b and 351b. In this manner, it is possible to prevent the collapse stroke from being hindered by the deformation mark.

The restriction member may have a configuration in which the movement of the extending portion 150 in the up-down direction with respect to the sliding portions 111 and 112 is restricted. That is, the restriction member may be configured so that the movement of the extending portion 150 in the up-down direction is indirectly restricted by the EA cover 300 in contact with a portion other than the extending portion 150 as in the second embodiment. The restriction member may directly restrict the movement of the extending portion 150 in the up-down direction by directly coming into contact with the extending portion 150 as in the head portions 350b and 351b according to the modification example.

The restriction member may be provided in the housing body 22 or may be provided in the pipe 12.

Alternatively, the components in the above-described embodiment can be appropriately replaced with well-known components within the scope not departing from the concept of the present disclosure, and the above-described modification examples may be appropriately combined with each other.

REFERENCE SIGNS LIST

1: Steering device
2: Steering wheel
11: Housing
12: Pipe (other member, one member)
13: Steering shaft
15: Load absorbing mechanism
46: Telescopic mechanism (one member, other member)
81: Telescopic motor unit (actuator)
82: Telescopic coupling portion (feed mechanism, shaft)
83: Telescopic movable portion (feed mechanism, nut)
111: First sliding portion
112: Second sliding portion
153: Wide portion
156: Guide (first guide, second guide)
200: Front pressing portion
200a: Top surface (front contact portion)
201: Rear pressing portion
201a: Top surface (rear contact portion)
210: Guide surface (facing surface)
260: First constriction portion (first narrow portion)
261: Second constriction portion (second narrow portion)
300: EA cover (restriction member)
350b: Head portion (restriction member)
351b: Head portion (restriction member)

What is claimed is:

1. A steering device comprising:
    a pipe into which a steering shaft is inserted to be rotatable around an axis along a front-rear direction;
    a housing supported by a vehicle body and configured to support the pipe to be movable in the front-rear direction;
    a telescopic mechanism configured to move the pipe with respect to the housing in the front-rear direction; and
    a load absorbing mechanism configured to connect the pipe and the telescopic mechanism to each other,
    wherein the telescopic mechanism includes
        an actuator coupled to the housing, and
        a feed mechanism having an engaging portion coupled to the actuator and an engaged portion coupled to the load absorbing mechanism and engaged with the engaging portion in the front-rear direction, and configured to transmit a driving force of the actuator to the pipe via the engaging portion and the engaged portion,
    the load absorbing mechanism includes
        an extending portion provided in any one member of the pipe and the feed mechanism and extending in the front-rear direction, and
        sliding portions each provided on both sides in a left-right direction with respect to the extending portion in the other member of the pipe and the telescopic mechanism, and moving with respect to the one member while sliding on a side surface of the extending portion which faces the left-right direction, when a forward load acting on the pipe has a predetermined value or greater, and
    at least one of the sliding portions includes
        a front pressing portion that comes into contact with the side surface of the extending portion, and
        a rear pressing portion provided behind the front pressing portion, and in which a first distance in the left-right direction between the rear pressing portion and the other sliding portion facing the one sliding portion across the extending portion is shorter than a second distance in the left-right direction between the front pressing portion and the other sliding portion.

2. The steering device according to claim 1, wherein a rear contact portion of the rear pressing portion which comes into contact with the extending portion and a front contact portion of the front pressing portion which comes into contact with the extending portion form curved surfaces each projecting toward the extending portion.

3. The steering device according to claim 1, wherein the one member is provided with
    a first guide located on a side opposite to the extending portion in the left-right direction with respect to the one sliding portion, and configured to guide movement of the one sliding portion in the front-rear direction, and
    a second guide located on a side opposite to the extending portion in the left-right direction with respect to the other sliding portion, and configured to guide movement of the other sliding portion in the front-rear direction.

4. The steering device according to claim 3, wherein a surface of the one sliding portion which faces the first guide and a surface of the other sliding portion which faces the second guide are formed into flat surfaces extending in the front-rear direction.

5. The steering device according to claim 1, wherein the extending portion includes
    a first narrow portion formed so that a width in the left-right direction is larger than the first distance and is equal to or smaller than the second distance, and the front pressing portion comes into contact,
    a second narrow portion located behind the first narrow portion, and formed so that a width in the left-right direction is equal to or smaller than the first distance, and
    a wide portion located in front of the first narrow portion and formed so that a width in the left-right direction is larger than the second distance.

6. The steering device according to claim 1, wherein the feed mechanism includes
    a shaft coupled to an output shaft of the actuator and having a male screw as the engaging portion, and
    a nut connected to the one member and having a female screw portion that engages with the male screw as the engaged portion.

7. The steering device according to claim 1 wherein the load absorbing mechanism includes a restriction member configured to restrict movement of the extending portion in an up-down direction with respect to the sliding portion.

* * * * *